(12) United States Patent
Sherwood et al.

(10) Patent No.: US 6,463,138 B1
(45) Date of Patent: Oct. 8, 2002

(54) TELEPHONE SYSTEM FOR FORMATTING CALLER ID INFORMATION INTO A FORM USEABLE BY AN APPLICATION PROGRAM AND EXPORTING THE CALLER INFORMATION TO THE APPLICATION PROGRAM

(75) Inventors: Charles Gregory Sherwood; Charles Arnold Lasswell, both of Olathe, KS (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/709,298

(22) Filed: Nov. 13, 2000

Related U.S. Application Data

(63) Continuation of application No. 09/058,778, filed on Apr. 13, 1998.

(51) Int. Cl.[7] ............................................... H04M 15/06
(52) U.S. Cl. ............................. 379/142.14; 379/142.15
(58) Field of Search ................................. 379/142, 144, 379/127, 93.17, 93.25, 93.23, 142.01, 142.06

(56) References Cited

U.S. PATENT DOCUMENTS

| | | | | |
|---|---|---|---|---|
| 4,776,005 A | * | 10/1988 | Petriccione et al. | 379/142 |
| 5,434,394 A | | 7/1995 | Roach et al. | 235/375 |
| 5,528,680 A | | 6/1996 | Karpicke | 379/355 |
| 5,646,839 A | | 7/1997 | Katz | 379/93.01 |
| 5,734,706 A | * | 3/1998 | Windsor et al. | 379/142 |
| 5,754,636 A | | 5/1998 | Bayless et al. | 379/142 |
| 5,761,278 A | | 6/1998 | Pickett et al. | 379/142 |
| 5,822,416 A | | 10/1998 | Goodacre et al. | 379/142 |
| 5,883,942 A | | 3/1999 | Lim et al. | 379/142 |

* cited by examiner

*Primary Examiner*—Curtis Kuntz
*Assistant Examiner*—Rexford N Barnie
(74) *Attorney, Agent, or Firm*—Pillsbury Winthrop LLP

(57) ABSTRACT

A telephone system which detects ring signals and detects caller ID signals and decodes them into caller ID data and then reformats the caller ID data into one or more alphanumeric strings useable by another computer process such as a point of sale computer process. User input is accepted such as by manipulation of switches to control the telephone system so as to add predetermine prefix or suffix codes or data to one or more items of caller ID data in accordance with the occurrence or existence of predetermined conditions that must be signalled to the computer process using the caller ID data being formatted by the telephone system.

2 Claims, 21 Drawing Sheets

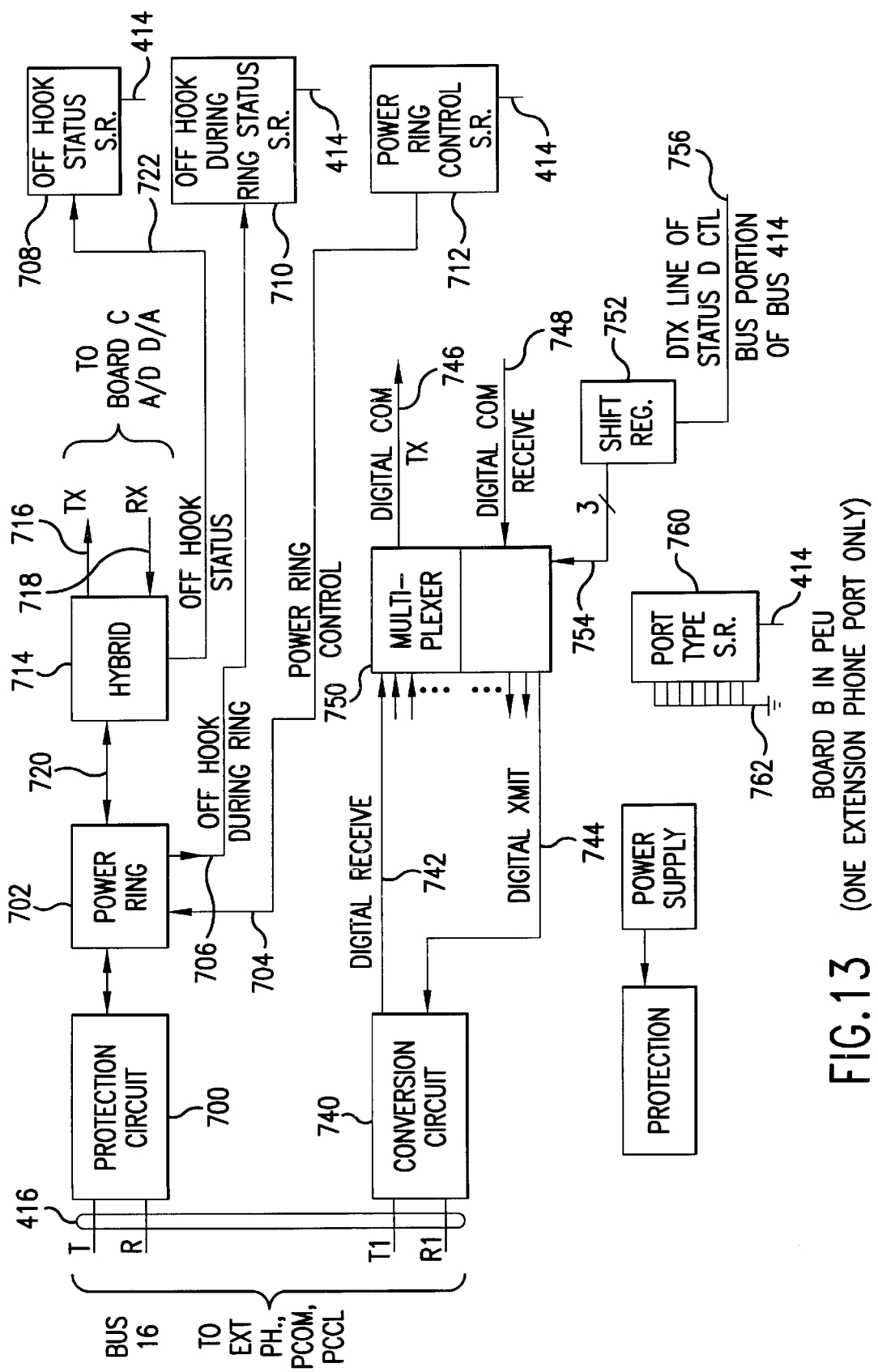
FIG. 13 (ONE EXTENSION PHONE PORT ONLY)

TELEPHONE SYSTEM FOR FORMATTING CALLER ID INFORMATION INTO A FORM USEABLE BY AN APPLICATION PROGRAM AND EXPORTING THE CALLER INFORMATION TO THE APPLICATION PROGRAM

CROSS REFERENCE TO RELATED APPLICATIONS

This application is a continuation of application Ser. No. 09/058,778, filed Apr. 13, 1998, now pending.

BACKGROUND OF THE INVENTION

In telephone systems, a system for transmitting caller identification information such as the caller's identification information such as telephone number and name has been in existence for several years. This caller ID (hereafter sometimes referred to as CID) information such as name and telephone number is used in many application processes running on computers in various formats and for various purposes. In many applications such as point of sale computer processes, the telephone is used to take orders and a computer is used to process order information including the information which is already in the caller ID information received by the telephone. A need exists for a telephone system which can receive and decode the caller ID signals into alphanumeric information and format them to a format useable by the computer process and export the caller ID information to the computer process to save the time and labor of asking the caller his or her name and telephone number and retyping that information into the computer.

Prior art systems directed at point of sale or caller ID processing include the following U.S. patents. U.S. Pat. No. 5,434,394 to Roach et al, filed Feb. 25, 1994 based on a parent application filed Sep. 10, 1992, teaches a main processor with a database of custome identification information and merchandise information located in a warehouse, and a pen-based processor at the point of sale coupled to the main processor. The pen-based processor is used to manually enter a customer number and a merchandise identification number. This information plus delivery method are transmitted to the main processor to build a sales transaction record and to effectuate delivery.

U.S. Pat. No. 5,528,680 assigned to AT&T by Karpicke teaches a caller ID telephone with a caller ID based directory of telephone numbers which automatically adapts its directory entries for changes in area code where the telephone is located. The telephone stores all area codes of incoming calls along with the telephone number. The user initializes the phone with his or her area code each time the area code in which the phone is located changes. When a request to dial a stored number is received, the phone compares the home area code to the area code of the number to be dialed to decide whether or not to include the area code of the number to be dialed.

U.S. Pat. No. 5,646,839 assigned by MCIC Corporation by Katz, filed Sep. 14, 1994 teaches a telephone based system using caller ID data and a computer with employee and telephone location databases for tracking the arrival and departure times of field based employees at client jobsites. Employees call in to the computer and enter their employee identification numbers which are used to access an employee database to determine if the call is authorized. Caller ID data is used to determine where the employee is located using the telephone location database. Records of calls with time and date stamps are stored. The records are used to generate reports which are used to track the movements of employees.

Some special applications of point of sale processing such as in processing pizza orders received by telephone require different processing of carry-out versus delivery orders. The point of sale computer process needs the name and telephone number of the customer, but there are special codes which are appended to the name or telephone number of the customer to indicate whether the order is carry-out or delivery so that scheduling of a delivery vehicle, if necessary, can be efficiently effectuated. In the prior art, telephone order takers had to ask the customer for their name and telephone number and manually enter this information via a keyboard coupled to the point of sale terminal along with the special code that specified the delivery option. This slowed down the process of taking orders and was subject to human error. Thus a need has arisen for a system which can automatically format caller ID data into a format needed by another computer process, append any special codes needed with the caller ID information and export the formatted caller ID data to the point of sale or other computer process.

SUMMARY OF THE INVENTION

In a first embodiment exemplifying the genus of the invention, a caller ID decoder or telephone with caller ID decoding capability is coupled to a telephone line from the central office and is coupled via a serial or parallel bus to a computer having in execution thereon an application process which needs name and/or phone number information as part of the data it processes to do some function. The caller ID decoder or the caller ID decoder portion of the telephone includes a caller ID detector/decoder chip, a display for displaying caller ID information, a display driver coupled to the display, a microprocessor coupled to the caller ID detector and the display driver and a UART or parallel bus driver coupled to the microprocessor. In operation, the caller ID decoding circuitry detects the presence of a ring signal and receives any caller ID signals sent. The caller ID decoder then decodes the signals into alphanumeric information and transfers it to the microprocessor which displays the caller ID information on the display. The microprocessor then reformats the caller ID information into one or more strings of the format used in the application process which needs the caller's name and/or phone number. Optionally, the microprocessor also adds any special codes as suffixes or prefixes to the reformatted strings. After all reformat and/or special code additions, the microprocessor in the caller ID decoder or telephone with caller ID capability sends the processed data to the application process which needs it.

In a specific embodiment constituting a species within the genus of the invention, a caller ID processing function is added to the complex business telephone system described herein to aid in point of sale processing of restaurant orders. In this system, a PEU with a caller ID circuit detects an incoming call and notifies a CSU central processor through a host adapter. The CSU orders the caller ID circuit to arm itself to receive caller ID data. The CSU then polls the caller ID circuit and collects any caller ID data received. The CSU then determines if valid caller ID data has been received and commands one or more extension phones designated in a routing table for receiving orders to ring. After one of the extension phones is answered, the CSU sends the caller ID data to the extension phone which was answered for display or sends a message that no caller ID data was received. After the caller ID data, if any, is displayed on the extension phone, a microprocessor in the extension phone reformats the caller ID data into one or more alphanumeric strings having the format needed in an application process running in a point of sale terminal. In the special case of restaurant orders where either carry-out or delivery are delivery options, the extension phone processor also adds a prefix code specifying whether the order is to be delivered or is a carry-out order that the customer will pick up. This special prefix code is added when the order taker who answered the extension phone presses either the take out or delivery button on the phone. After the caller ID data has been added and any special prefix or suffix code has been added, the processed caller ID data is transmitted to the point of sale terminal via a serial bus coupling the extension phone to the point of sale terminal.

DESCRIPTION OF THE DRAWINGS

FIG. 13 shows a block diagram of the circuitry for one extension phone port on board B in the PEU 410 in FIG. 5.

DETAILED DESCRIPTION OF THE PREFERRED EMBODIMENT

Figure 1:
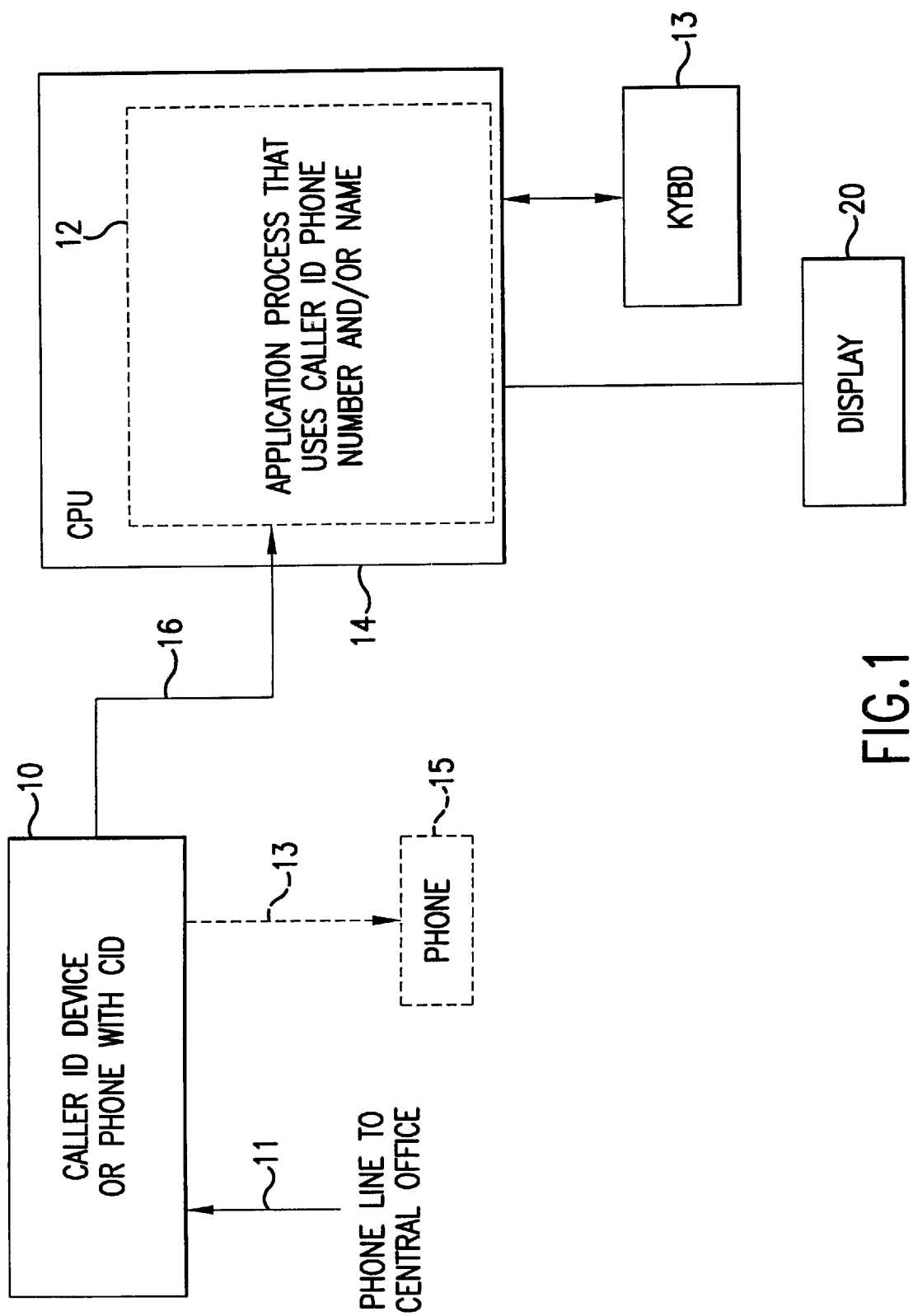
FIG. 1 is a block diagram of a simple system which exemplifies the genus of the invention.

Referring to FIG. 1, there is shown a block diagram of a simple system exemplifying the genus of the invention. A caller ID detector/decoder 10 is coupled to a telephone line 11 coupled to the central office of the telephone company. In the case where the caller ID detector/decoder is a stand alone device, another telephone line 13 couples the caller ID detector/decoder to a telephone 15 without caller ID capability. The caller ID detector/decoder 10 is coupled via a serial or parallel bus 16 to a computer 14 such as a point of sale terminal with a keyboard 18 and a display 20.

Figure 2:
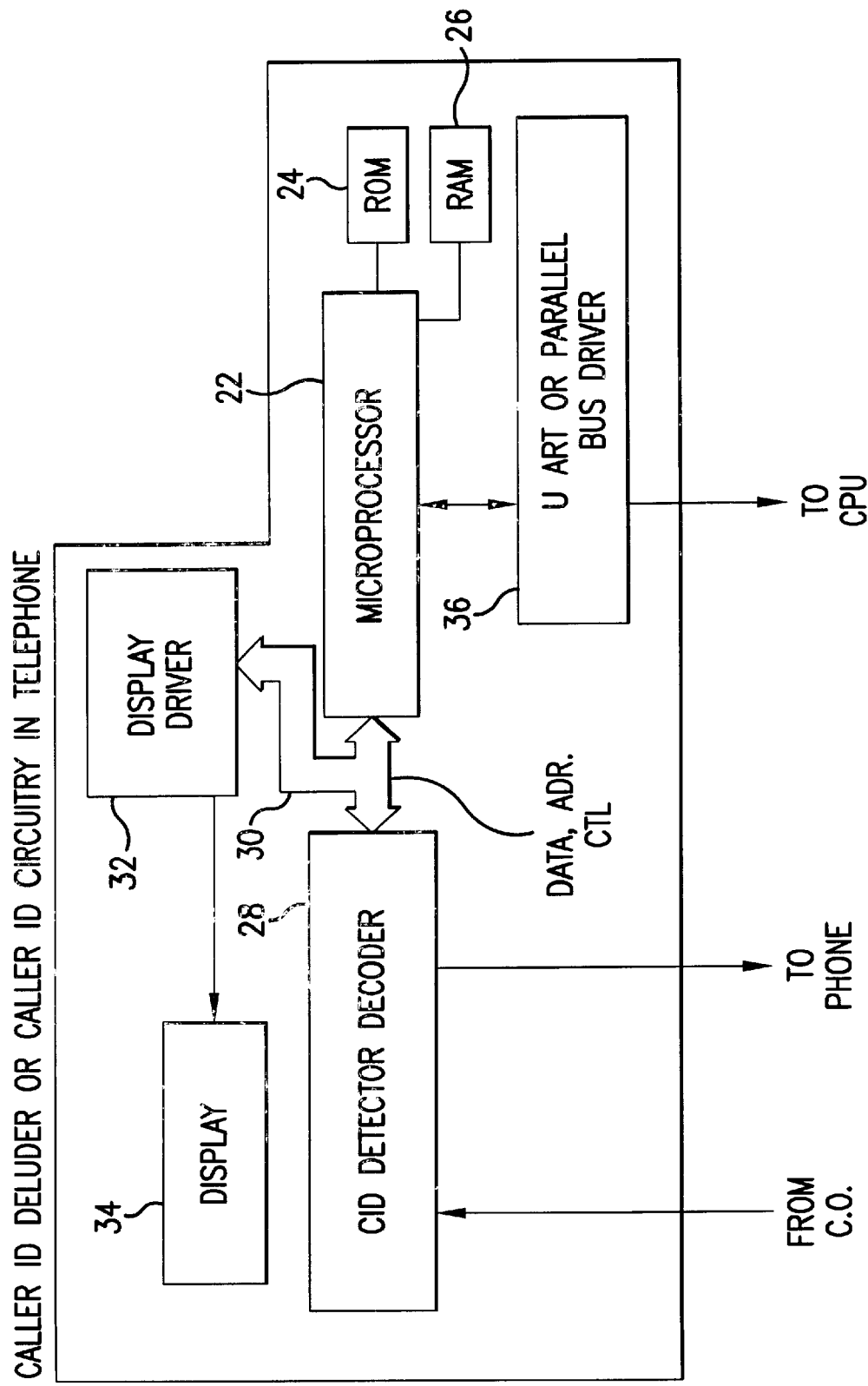
FIG. 2 is a block diagram of the circuitry of the caller ID decoder device or the caller ID portion of the circuitry of a telephone which performs the function of the invention.
Figure 3:
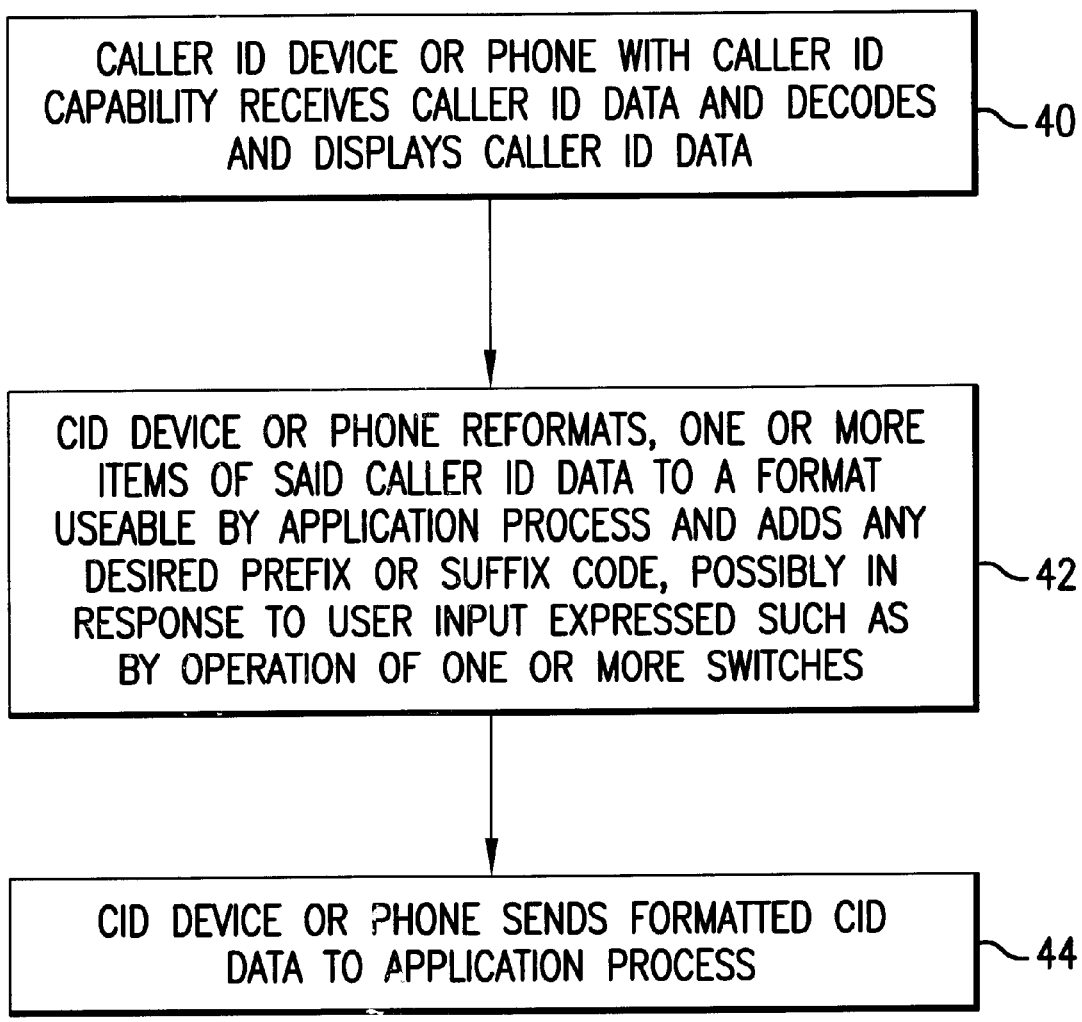
FIG. 3 is a flow chart of the processing by the microprocessor of the caller ID detector/decoder of FIG. 2 to reformat and export caller ID data to an application process that needs the caller's name and/or phone number for its processing.

The caller ID detector/decoder can have any structure capable of performing the functions detailed in the flowchart of FIG. 3, but FIG. 2 exemplifies one typical embodiment. The device utilizes a microprocessor 22 programmed by a program in ROM 24 to carry-out the process of FIG. 3 to format caller ID data into an alphanumeric string useable by application process 12 and add any necessary prefix or suffix codes or data. The microprocessor uses RAM 26 to temporarily store the reformatted data. A caller ID detector/decoder circuit 28 of a type typically commercially available as an integrated circuit is coupled to the microprocessor by suitable data, addressing and control signal lines. The microprocessor 22 is also coupled to a display driver 32 which is coupled to a display 34 such that incoming caller ID data decoded by the caller ID detector/decoder can be transferred to the microprocessor which then sends it to the display 34 via the display driver. In some embodiments, the caller ID detector/decoder is coupled directly to the display 34 or to the display through a display driver and has a separate connection to the microprocessor. The microprocessor, after reformatting the caller ID data, sends it to the application process 12 via a UART serial bus driver or a parallel bus driver, symbolized by block 36.

Referring to FIG. 3, there is shown a flowchart of the process carried out by the microprocessor 22 of FIG. 2. Block 40 represents the process carried out by the caller ID detector/decoder device or phone with caller ID capability detecting caller ID signals and decoding them into caller ID data and displaying the caller ID data. Block 42 represents the process carried out by the caller ID device or phone with caller ID capability of reformatting the caller ID data into one or more alphanumeric strings having a format useable by the application process to which the data is to be transferred, and, optionally, adding any prefix or suffix data or codes to the string. Block 44 represents the process carried out by the caller ID detector/decoder device or phone with caller ID capability sending the formatted caller ID data strings to the application process which needs the caller ID data.

The genus of the invention is characterized by a caller ID detector/decoder device 10, either standing alone or in a phone, which can detect and decode caller ID signals, reformat them into an alphanumeric string in a format useable by an application process 12 in execution on a computer 14 coupled to the phone/caller ID device by a serial or parallel bus 16. The caller ID circuitry also optionally adds any prefix or suffix codes or data needed by the application process, and then exports the processed data to the application process 12 via bus 16.

A specific example of a species within this genus will be described next. This particular example is for a restaurant order reception telephone system which cooperates with a point of sale computer system to process telephone orders for carry-out and delivery food orders. The caller ID data is used by an application process which uses caller ID data to look up the caller in a database to obtain the caller's address and previous order history and which sends the order to the kitchen and schedules vehicles for delivery orders. The caller ID data is formatted by the telephone system into the format it would have had if the order taker had typed the order into the point of sale terminal. The order taker pushes one of two buttons on the phone to indicate whether the order is a carry-out or delivery order, and this causes a prefix code to be added to the alphanumeric string generated from the received caller ID data prior to export of the processed caller ID data to the application process in the point of sale terminal. The discussion begins with a description of the hardware of the telephone system.

Figure 4:
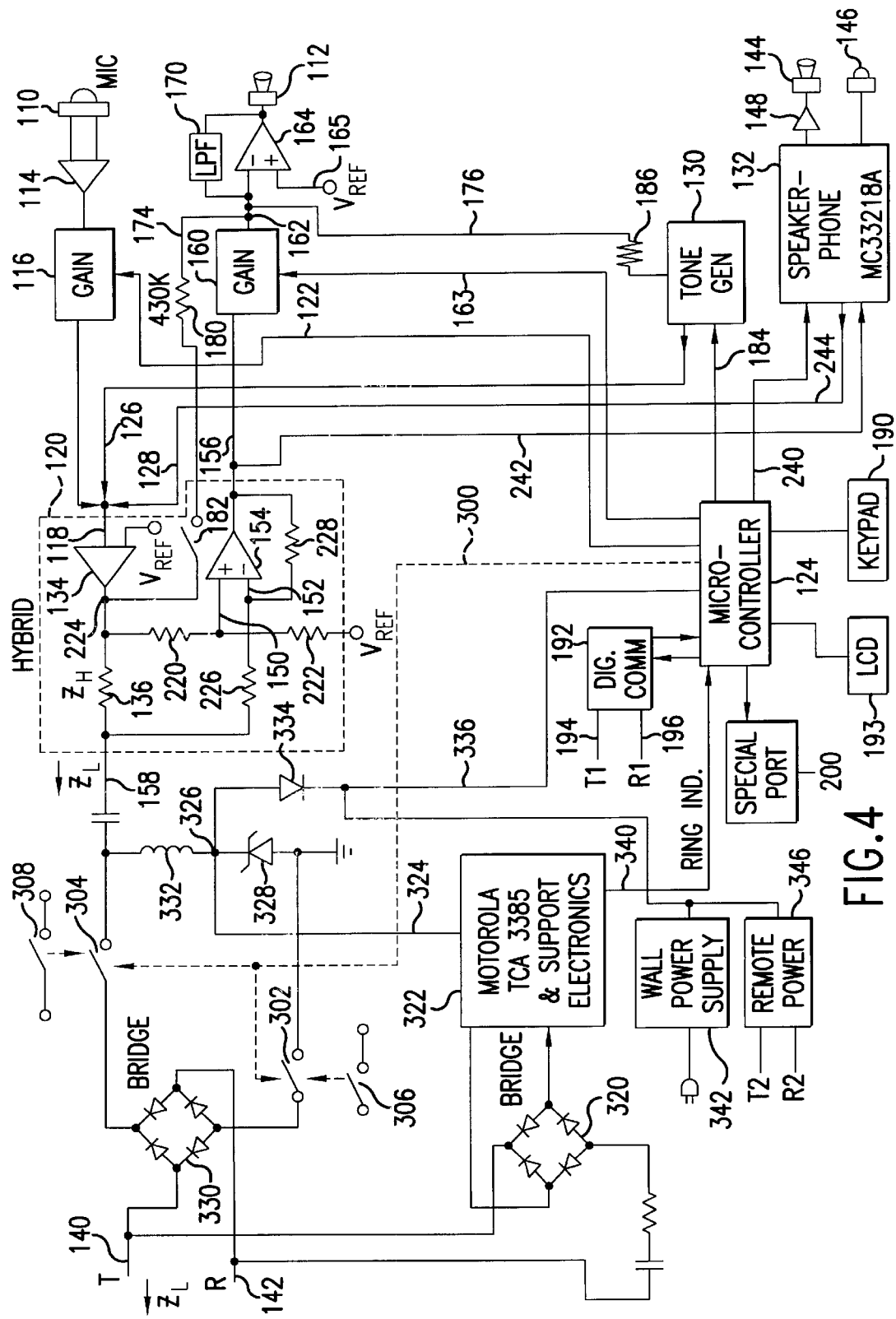
FIG. 4 is a block diagram of a display telephone with caller ID processing capability such as may be used in the telephone system having the caller ID processing capability of the invention.

Referring to FIG. 4, there is shown a block diagram of a telephone with a programmable sidetone suitable for use in a system according to the teachings of the invention. The handset of the phone has built therein a microphone 110 and a speaker 112 or other type of transducer to convert audio signals to audible sounds. The phone also has a built-in speakerphone comprised of microphone 146 driving a speakerphone circuit 132, said speakerphone circuit also driving a speaker 144 (or other type of transducer to convert audio signals to audible sounds) through a power amplifier 148. The microphone 110 is coupled to an amplifier 114 which drives the analog transmitted signal input 118 of a hybrid 120 through a programmable gain circuit 116. The programmable gain circuit 116 is controlled by a signal on line 122 from microcontroller 124. The program for microcontroller 124 is given in Appendix A attached hereto, the language being ported for an AT89C52 microprocessor manufactured by Atmel. The programmable gain circuit 116 is typically a digitally controlled multiplexer switch which switches a selectable one of a plurality of resistors into the gain control resistor network of an operational amplifier within the programmable gain control circuit 116 thereby controlling the gain of the operational amplifier.

The hybrid 120 also has analog audio inputs at 126 and 128 for signals from a DTMF tone generator 130 and a speakerphone circuit 132, respectively. The tone generator 130 and the speakerphone 132 are both commercially available integrated circuits, the speakerphone being a Motorola MC33218A and the tone generator being a Phillips PCD3311CP. All these audio signals are summed at input 118 and amplified by amplifier 134. The output of amplifier 134 drives an impedance 136 which is set to match the impedance $Z_L$ seen looking into the tip and ring lines when the tip and ring lines 140 and 142 are connected into the analog tip and ring lines of a PEU port of a phone system supplied by the assignee of the present invention. When this situation is true, the impedance match is so close that very little sidetone is generated at speaker 112 of the handset (or speaker 144 of the speakerphone if the speakerphone is being used). Sidetone is generated at a higher level however when the phone is plugged into the public telephone network or a telephone system supplied by another supplier where the value of $Z_L$ is not known. This happens because the impedance 136 does not match the impedance $Z_L$ which causes the signals received at noninverting and inverting inputs 150 and 152 of differential amplifier 154 to be unbalanced thereby generating a portion of the transmitted audio signal on line 158 as a sidetone signal at output 156. This sidetone signal is mixed with incoming audio signals from the other conversant arriving on the tip and ring lines 140 and 142 and is amplified in a programmable gain circuit 160.

The function of the programmable gain circuit 160 is to allow control of the gain of the receive circuitry driving speaker 112. The programmable gain circuit 160 receives a signal from microcontroller 124 on line 163 which controls switching of a multiplexer inside the programmable gain circuit 160 to set the gain. The programmable gain circuit 160 is a multiplexer having one input coupled to line 156 and a plurality of outputs each of which is coupled to a different size resistor (not shown but included within circuit 160). The control signal on bus 163 controls which of these resistors is placed in series between line 156 and a summing junction 162 at one of the differential inputs of a differential amplifier 164. The other input of amplifier 164 is coupled to a reference voltage via line 165.

The function of amplifier 164 and programmable gain circuit 160 is to provide a variable gain to the received signal which is sufficient to make the signal audible at speaker 112. Amplifier 164 is schematically shown as a differential amplifier, but it is actually a differential amplifier coupled to drive a push-pull transistor pair acting as a power amplifier. The differential amplifier has a noninverting input coupled to a reference voltage via line 165. The inverting input is coupled to summing node 162. Low pass filter 170, comprised of a 100K resistor in parallel with a 0.00027 microfarad capacitor, provides a feedback path from the output of the pair of amplifiers 164 to the summing node 162 to convert the summing node into a virtual ground. The signal heard at speaker 112 is the sum of the audio signals on lines 174, 176 and the output of the programmable gain circuit 160. Line 176 comes from the DTMF tone generator 130 through resistor 186. This tone generator can be commanded by the microcontroller 124 via commands on bus 184 to generate DTMF dialing tones, ring tones and other call progress tones needed to signal to the user various phases of the call. Because line 176 is coupled to summing node 162, when DTMF or other tones are generated, they can be heard at a reduced volume through speaker 112. This is because when the microcontroller 124 turns the tone generator on, it turns off the programmable gain circuit 160 and opens switch 182 so no sidetone feedback reaches summing node 162. This causes the gain of amplifier 164 to be set by the ratio of the resistor in low pass filter 170 to resistor 186. Resistor 186 is selected to establish the desired gain level for these call progress tones.

Programmable sidetone level is achieved by bypassing the hybrid with feedback of part of the transmitted audio. Line 174 is the programmable sidetone bypass path which selectively feeds part of the transmitted audio signal from amplifier 134 back to the summing node 162 through a resistor 180 and switch 182. In the preferred embodiment, the switch 182 is a transistor having an on state in which a low resistance path exists coupling the output 224 of amplifier 134 to resistor 180, and having an off state in which the path from line 224 to resistor 180 is a high resistance path. The on or off state of switch 182 is controlled by microcontroller 124. In alternative embodiments, the switch 182 can be a mechanical switch which is directly operable by the user and is not controlled by the microcontroller.

In the preferred embodiment, the microcontroller controls the phone such that if it has turned on the tone generator and commanded it to generate a tone, then it will simultaneously control the programmable gain circuit 160 to shut off the signal path from line 156 to the summing node 162. If the tone generator is turned on, the microcontroller will also control switch 182 in the programmable sidetone signal path to open it thereby cutting off the sidetone feed into the summing node 162. When the tone generator is on, the gain of amplifier 164 will be set by the ratio between the resistor in low pass filter 170 and resistor 186.

When the tone generator 130 is turned off, the microcontroller 124 will control the gain circuit 160 to set some desired gain level and may or may not turn on switch 182. Switch 182 controls the level of sidetone generated regardless of whether there is an impedance match or not between impedance 136 and $Z_L$. Further, when the phone is connected to a phone system supplied by the assignee, there will be an impedance match and very little sidetone will be generated when switch 182 is open but more sidetone will be generated when switch 182 is closed. The microcontroller 124 will control gain control circuit 160 to some level of gain when the tone generator 130 is not on and may or may not close switch 182, depending upon its configuration data which is programmed by the user (or which is sent to the microcontroller from a central process via the digital communication circuit 192). When the programmable gain control circuit 160 has a level of gain selected, the gain of amplifier 164 is controlled by the ratio of the resistor in low pass filter 170 to whatever resistor is selected by gain circuit 160. When the sidetone control switch 182 is closed, the gain of the amplifier 164 is controlled by the ratio of the resistor in low pass filter 170 to resistor 180, and the sidetone signal on line 174 is summed at node 162 with whatever incoming audio exists on line 156 plus any sidetone component it has (which depends upon the level of impedance match between the hybrid and the impedance $Z_L$ seen looking into the tip and ring lines). In one embodiment, the user can program the phone's microcontroller 124 using the keypad 190 and LCD display 193 to control various aspects of the phone's operation including whether to increase or decrease the level of sidetone. In other embodiments, switch 182 can be a manually operated switch on the side of the phone which can be operated directly by the user. Generally, if the phone is to be used in a noisy environment such as on a factory floor or in a restaurant with numerous customers, the level of sidetone should be set lower so as to not interfere with clearly hearing the other party to the conversation by addition of noise picked up in the noisy environment by the handset microphone.

In the preferred embodiment, the microcontroller 124 can receive digital commands from a control process running elsewhere in a phone system of which the phone is a part. That digital communication channel is symbolized by digital communication circuit 192 which is coupled to T1 and R1 lines 194 and 196. The microcontroller can also output digital data to other systems such as point of sale computers via a serial port 200. A novel application of these two digital communication paths is for the control process running elsewhere to receive caller ID information and decode it and send the caller ID information to the microcontroller 124 via digital communication circuit 192. The microcontroller 124 then packages this caller ID information into a packet or other data block useable by whatever system is coupled to serial port 200 and sends the caller ID information to the other system via the serial port.

The receive portion of hybrid 120 centers on differential amplifier 154. Resistors 220 and 222 sample part of the transmitted audio on line 224 and couple it via line 150 to the positive input of differential amplifier 154. Resistors 226 and 228 sample a portion of the line signal across $Z_L$ and couple it via line 152 to the inverting input of amplifier 154. The ratio of resistor 220 to resistor 222 versus the ratio of resistor 226 to resistor 228 are adjusted so as to give good cancellation so as to generate little sidetone when the phone is connected to a phone system where there is a good impedance match between $Z_L$ and the output impedance 136 of the hybrid. This level of sidetone can be increased by the user for quiet environments by closing switch 182. For noisy environments, switch 182 is left open.

Microcontroller 124 can enable speakerphone circuit 132 via line 240 for purposes of paging when the phone in use is a phone system such as is supplied by the assignee. In an embodiment where such a phone system is in use, when a page is to be sent out to all phones in the system to find somebody, the microcontroller 124 enables the speakerphone via line 240 and sets the speakerphone volume. This happens when the microcontroller 124 receives digital information via the digital communication circuit 192 that a page is coming. Next, the microcontroller 124 electronically commands the phone to go offhook. This is done by sending a signal on a path represented by dashed line 300 to cause switches 302 and 304 to close thereby causing the phone to go offhook. Switches 302 and 304 are actually transistors which turn on when the microcontroller commands the offhook condition. Switches 302 and 304 can also be closed by the physical action of lifting the handset off the cradle. This causes physical hookswitches 306 and 308 to actuate in such a manner as to cause drive voltages to the transistor switches 302 and 304 so as to turn them on.

To complete the page, the central process of the phone system (not shown) then sets up switching circuitry in a portion of the phone system central controller (not shown) such that the audio information of the page is routed to a PEU unit (not shown) to which all the phones are connected. From the PEU unit, the audio signals of the page are routed to the tip and ring lines of all the phones in the system. The audio signals of the page then enter each phone through tip and ring lines corresponding to lines 140 and 142 and pass through the hybrid 120 and appear on line 242. The audio signals on line 242 are coupled to the speakerphone circuit and are amplified by amplifier 148 and broadcast from speaker 144.

The phone of FIG. 1 can also be used as a room monitor. If the phone is to be used in this mode, the central control process sends a command via the digital communication circuit 192 commanding room monitor mode. This causes microcontroller 124 to enable the microphone path of the speakerphone circuit 132 and command the phone to go offhook via a command on line 300 closing switches 302 and 304. Any sounds in the room which are sufficiently loud will then be picked up and converted to audio signals which are transmitted to the central control process for monitoring via line 244, hybrid 120 and tip and ring lines 140 and 142.

Neither paging nor room monitoring will work when the phone is physically on hook and not ringing, unless the phone has a power supply external to the power supplied via the tip and ring lines. The phone is self-powered whenever it receives a power ring on the tip and ring lines. A power ring signal is a high voltage (120 VAC max) AC signal across the tip and ring lines. This signal is rectified to pulsating DC signals by bridge 320. These DC pulses are filtered and converted to steady state DC by circuit 322. This circuit is a Motorola TCA 3385 and the supporting electronics necessary to make it function properly. The DC voltage generated by circuit 322 is output on line 324 to node 326. Node 326 supplies power through diode 334 to line 336. Line 336 is the line from which power to other circuits in the phone is taken. A zener diode 328 regulates the voltage on node 326 to prevent it from ever rising above the Zener's breakdown voltage.

When a power ring signal is received, circuit 322 generates a ring indicator signal on line 340 which informs the microcontroller 124 that a power ring is being received. The microcontroller then sets the gain of programmable gain circuit 160 to zero, opens switch 182, enables tone generator 130 via a command on bus 184 and instructs it to generate a ring tone. The microcontroller 124 also activates the speakerphone circuit 132 via line 240 such that an audible ring is output by speaker 144.

In addition to being self-powered when a power ring signal is being received, the phone is also self-powered whenever it is offhook. When offhook, switches 304 and 302 are closed, and loop current in one of the tip and ring lines 140 or 142 and through bridge 330. Protection circuitry to protect the phone electronics from voltage spikes on the tip and ring lines is not shown. Bridge 330 forces this loop current to always have a known polarity. An artificial inductor 332 comprised of two transistors coupled to have a high impedance to AC but a low impedance to DC serves to couple the DC loop current to node 326. The zener diode 328 regulates the voltage at node 326 to the voltage needed by the circuitry of the phone. DC power is supplied from line 336 to the microcontroller 124 via diode 334. Power connections to other circuits such as the speakerphone and amplifiers are not shown.

From the foregoing it is apparent that, unless an external power supply is used, the phone is completely unpowered if it is on hook and not receiving a power ring signal. Thus, to use the phone for paging or room monitoring, an external power supply must be used. Wall power supply rectifier circuit 342 can be used for this purpose and supplies rectified DC to node 336. Likewise, if the phone is connected to a phone system including a PEU such as is supplied by the assignee of the present invention, external power can be supplied via T2 and R2 lines from the PEU. Circuit 346 can be used to condition the power received on T2 and R2 and to isolate the phone electronics from any surges on these lines.

When speaker phone circuit 132 is to be used for a conversation, sounds picked up by the microphone 146 are amplified in the speakerphone circuit and output on line 244 where they are input to the hybrid 120 at summing junction 118. They are amplified by transmit amplifier 134 and coupled to the tip and ring lines 140 and 142. Sounds from the other conversant arrive on the tip and ring lines and pass through the hybrid 120 and are output by receive amplifier 154 at audio output port/line 156. This port is coupled to the audio signal input of the speakerphone 132 and is coupled through the speakerphone duplexing and feedback suppression circuitry to amplifier 148 and speaker 144.

The digital communication circuit can be any circuit suitable to receive digital information in whatever form or packet organization it is sent and format it for transfer to whatever microcontroller is in use. Since there are so many different possibilities for these two issues, and since the digital communication circuit can be easily designed by those skilled in the art once the protocol is known and the microcontroller is known, no further details about the digital communication circuit are given here.

In an alternative embodiment, resistors 220 and 222 can be programmable so that their ratio is programmable by the user. The ratio of the resistance of these two resistors controls the amount of sidetone that will be present in the path through the receive amplifier 154, and making this ratio programmable provides the capability for the phone to have an adjustable level of sidetone even if an imperfect impedance match exists such as where the phone is connected to a phone line connected directly to the central office. The resistors can be made programmable in any known way such as by mechanical selector switches operable by the user which are connected to arrays of resistors or through the use of circuits like the programmable gain circuits 116 and 160 which are under control of the microprocessor. In some embodiments, the microprocessor 124 will control the value of resistors 220 and 222 on the basis of configuration data which can be altered at will by the user.

Figure 5:
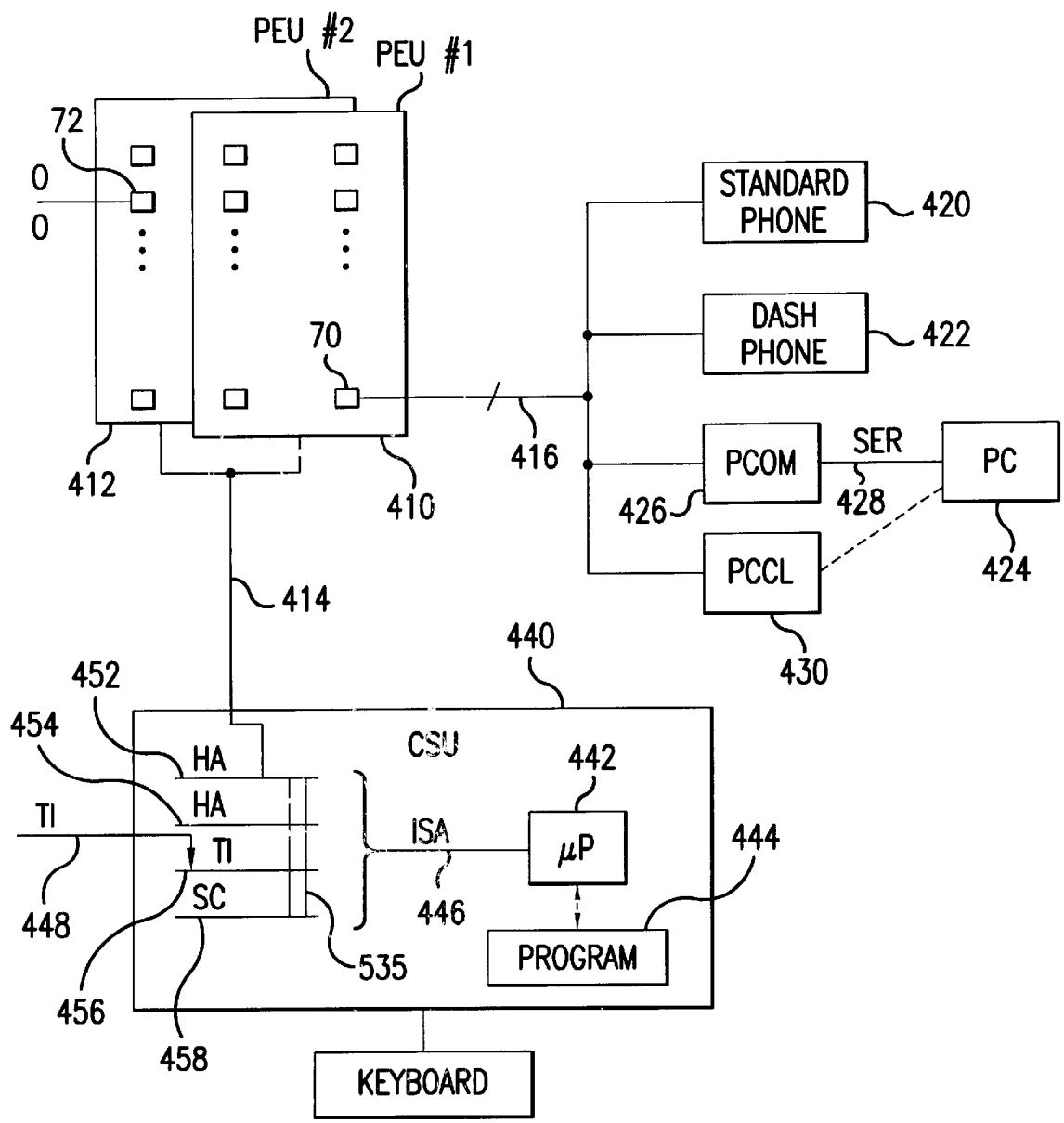
FIG. 5 is a block diagram of one type telephone system in which the system of the invention can be usefully employed.

Referring to FIG. 5, there is shown a block diagram of a digital telephone system with voicemail capability at the user site in which the system of the invention may be employed.

The system is comprised of first and second port expansion units (PEU) 410 and 412 coupled together by digital bus 414. The PEUs 410 and 412 each have a plurality of modular connectors to which individual drop lines such as drop line 416 are connected. Each drop line is a bus with analog tip and ring lines to carry analog voice signals back and forth to the extension phones and digital T1 and R1 lines carrying certain signals and power and ground lines. The PEU converts all analog voice signals coming in from the extension phones to digital data for transmission on bus 414 to the CSU 440, and all digital data coming from the CSU destined for any extension phone is converted in the PEU back to analog signals for transmission to the particular extension phone for which it is bound. Conversion to the digital domain is used because the CSU switching functions to connect various extension phones to each other or to the central office are all done using digital switching circuitry and various digital signal processors are used in the CSU to monitor call progress and do gain control etc.

Each drop line couples a port to any or all of a standard telephone 420, a specially Dash phone 422 of a type which has been in public use for more than a year and commercially available from Picazo Communications of Lenexa, Kans. Each drop line may also couple a port of the PEU to a personal computer 424 through a PCOM circuit 426 and a serial bus 428 and/or a PCCL circuit 430 which is an expansion card in the PC 424. The PCOM and PCCL circuits 426 and 430 are well known having been in public use for more than a year. These circuits are also commercially available from Picazo Communications of Lenexa, Kans. The PCOM and PCCL circuits are hardware interfaces controlled by software run on the PC 424 which allow well known computer-telephone interface services to be implemented such as automatic dialers, call timers, handle multiple calls etc.

Up to eight port expansion units may be added to the system along with the required host adapters to add or delete phones. Each PEU has 16 ports eight of which are selectable between connection to a telephone line from the central office (CO) or an extension phone/CTI equipment, and the other eight of which may be coupled to extensions only. On the ports coupled to telephone lines from the central office, caller ID can be detected.

The multiple PEUs are coupled by digital bus 414 to a central switching unit CSU 440. The CSU 440 is a DOS based machine which includes a microprocessor 442 under control of program 444 and coupled via an ISA bus 446 to multiple circuit cards.

The control program 444 controls the microprocessor 442 to carry-out a PBX switching and control process which is referenced in later drawings as PBX process 444. The multiple circuit cards include one or more host adapter cards each of which couples one, two, three or four PEUs to the CSU. Circuit cards 452 and 454 are typical of the host adapter cards. The CSU may also contain a T1 interface circuit 456 which interfaces the CSU to a T1 line 448 from any telephone company provider of T1 high capacity services. Each T1 line can carry 24 voice time-division-multiplexed channels on two pairs of wires. If a T1 line is coupled to the CSU, the PEUs are not needed other than for coupling the CSU to extension phones so all optional ports can be programmed to connecting to phones.

The CSU also contains one switch card 458 which serves to switch digital traffic between various extension phones or between extension phones and the CO. The switch card will be described in greater detail later. The circuitry of the switch card 458, the T1 card 456 and the host adapter cards 452 and 454 are well known and in the prior art and are commercially available from Picazo Communications of Lenexa, Kans.

Caller ID information can be received either by the CSU over the T1 line 448 or via the regular telephone line 450 from the CO. The ring signal on the CO line is carried on the single pair of the telephone line 450. The ring signal is a high voltage AC signal from 40–120 VAC with a frequency from 15–63 Hertz, typically 20 Hz.

Figure 6:
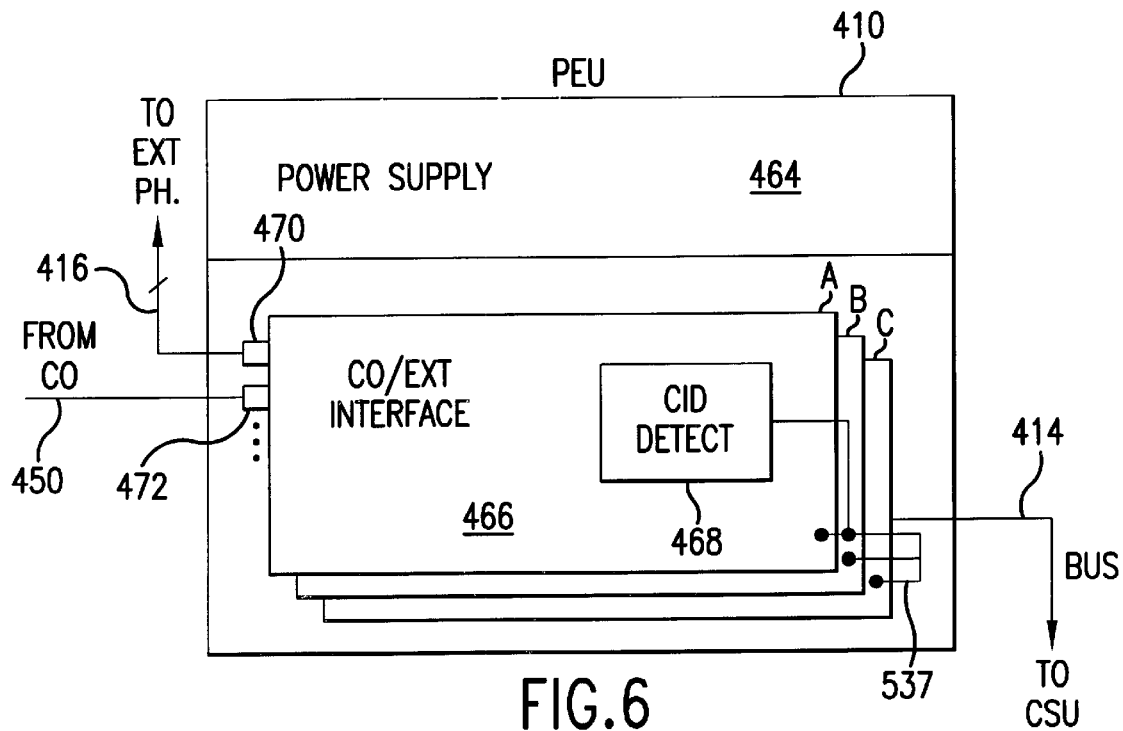
FIG. 6 is a layout diagram of the physical configuration of the PEU.

FIG. 6 is a layout diagram of the structure of a typical PEU. It is comprised of a power supply 464, a CO/extension phone interface circuit 466 and a caller ID detect circuit board 468 which is plugged into the interface circuit board 466 as an option. The CO/extension phone interface circuit 466 has a plurality of modular plugs such as port 470 to which an extension phone is coupled via drop line 416 and port 472 to which a telephone line 450 from the CO is coupled. The circuitry of the CO/extension phone interface circuit 466 and the circuitry and software of the caller ID detect circuit 468 and software is well known and has been in public use for more than one year. In prior art DASH phone systems, the caller ID detect circuit 468 was an external module that plugged into the CO ports such that the CO line would plug into the module and the module would plug into the port. Incoming telephone calls then passed through the module and caller ID information was detected as the call passed through. The caller ID detect circuit 468 is commercially available from Picazo Communications of Lenexa, Kans., but any caller ID detection circuit that can function as described herein to transfer caller ID information to another process will suffice.

The CO/extension phone interface circuit 466 will be called board A hereafter. The PEU is actually comprised of two other boards labelled board B and board C in FIG. 6. Boards B and C are also known in the art having been in public use for more than a year. They are commercially available from Picazo Communications of Lenexa, Kans., but any other circuit that can function as described herein will suffice. Board B functions to interface eight ports connected to extension phones such as port 470 in FIG. 6. Board C functions to perform analog-to-digital and digital-to-analog conversions and has a DTMF tone detector thereon. Boards A, B and C are coupled together by an internal bus 537 and are coupled to bus 414. Bus 414 carries voice in digital data form and is coupled to board C.

Figure 7:
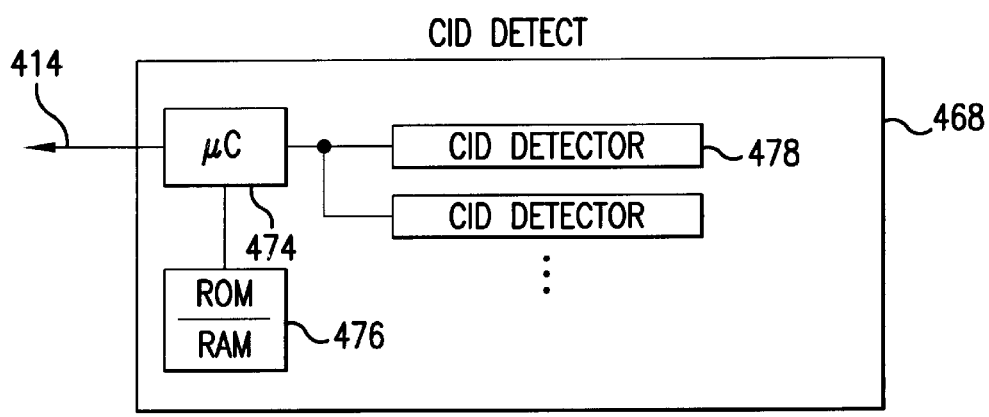
FIG. 7 is a block diagram of parts of the CID detect circuit pertinent to caller ID detection.

The structure of the caller ID detector circuit 468 is shown in FIG. 7. It is comprised of a microcontroller ROM/RAM program and working memory 476 and a plurality of caller ID integrated circuits of which chip 478 is typical. The caller ID circuits are commercially available from Mitel under the designation MT8841A. Because the CO/extension phone interface circuit 466 has 8 ports which may be programmed for coupling to a telephone line from the CO, the caller ID detector circuit 468 includes 8 caller ID detection chips like chip 478. When a call rings which has caller ID information, the caller ID chip for the associated port detects the caller ID information and passes it to the microcontroller 474 which stores it in RAM 476 for later access by a host adapter 452 in the CSU 440. The CSU microprocessor 442 can then use the caller ID information for various purposes such as routing the call.

Figure 8:
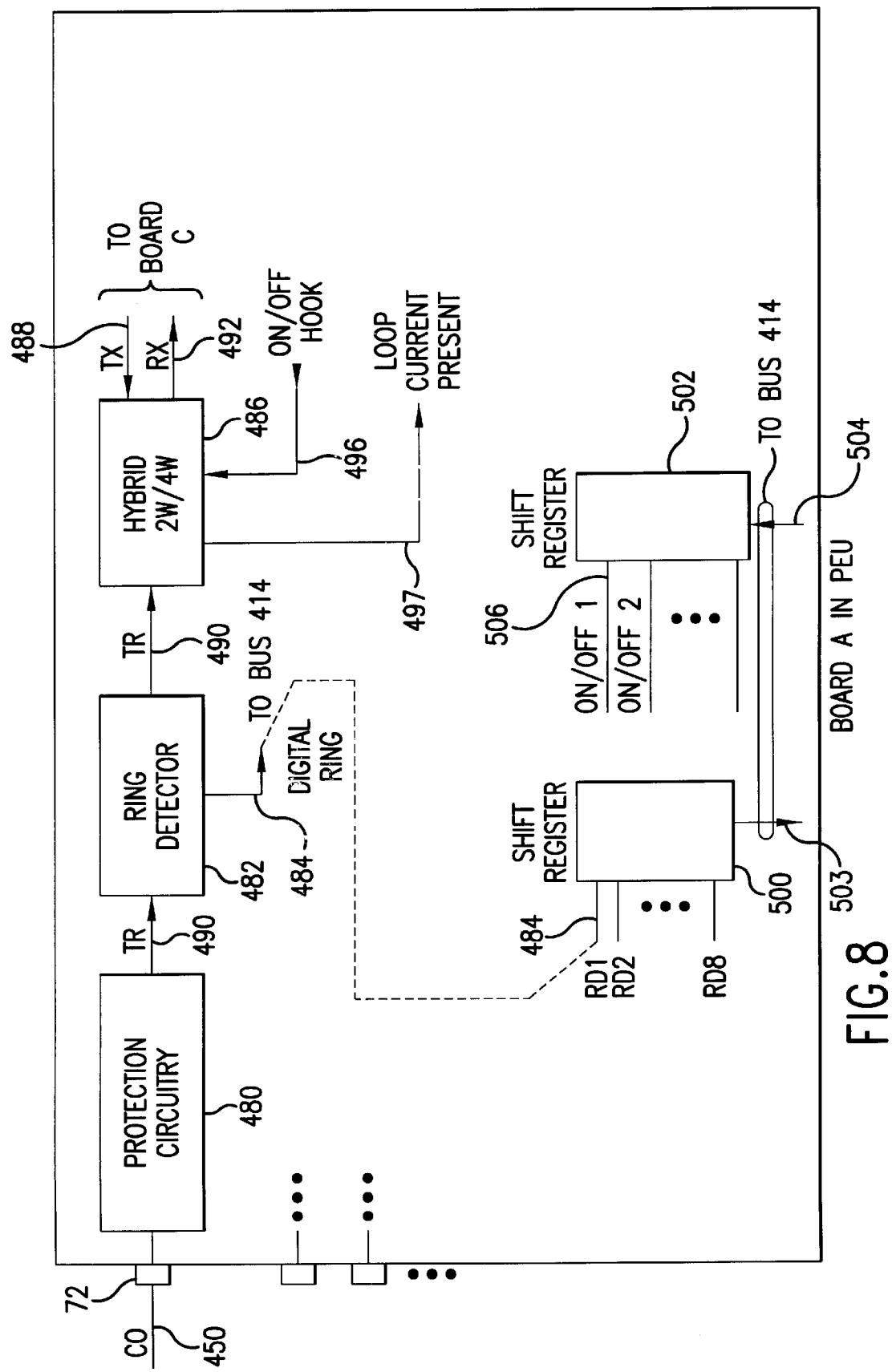
FIG. 8 shows a block diagram of the A board which connects the PEU 410 in FIG. 5 to one or more central office telephone lines.

FIG. 8 shows a block diagram of the A board which connects the PEU 410 in FIG. 5 to one or more central office telephone lines. The structure of the A board has been in public use for more than a year. The CO telephone line 450 couples to a protection circuit 480 on this board which serves to protect the circuitry on the board from surges or spikes of voltage on the telephone line. A ring detector 482 is coupled to the protection circuitry to detect ring signals on the CO line and convert the ring signal to a digital logic level on line 484. Line 484 is coupled to the CSU 440 in FIG. 5 via bus 414.

A hybrid circuit 486 is coupled to the CO telephone line 450 through the ring detector 482 and the protection circuit 480. There are 8 circuits like that shown on FIG. 8 on the A board, one for each of the 8 CO ports. Hybrid circuits are well known in the art and function to perform a 2-wire to 4-wire conversion so as multiplex transmit analog signals on pair 488 onto pair 490 and take received analog signal on pair 490 and put them onto pair 492. Pairs 488 and 492 are coupled to the C board for D/A and A/D conversion. There are jumpers on the A board which can turn it into an interface to connect to extension phones. When so converted, the ring detector 482 becomes an off-hook detector, and a digital control circuit inside hybrid 486 which tells the hybrid to go on or off hook in accordance with a logic signal on line 496. When the hybrid is in an on-hook configuration, there is no DC coupling between the tip and ring lines of the pair 490 (high DC resistance between tip and ring). When the hybrid is commanded to be off-hook, the DC resistance between the tip and ring lines of pair 490 is controlled by hybrid 486 to be low. This is how the phone company central office equipment tells whether the hybrid has gone off-hook and gives a dial tone. The on/off hook signal controls a relay in the hybrid circuit 486 to set an on-hook or off-hook condition so that the CO may think an extension phone is off or on its hookswitch even though that is not actually the case. This allows an incoming phone call to be "answered" by the PEU by receipt of an off-hook command for the appropriate port via bus 414 from CSU 440. The incoming voice signals are then digitized and transmitted to the CSU for further processing such as routing to the appropriate extension phone by virtue of the caller ID information between ring signals, playing of a standard greeting message, routing to the appropriate extension phone by virtue of DTMF extension digits dialed by the calling party etc. All this processing can happen before any extension phone is even picked up.

Another status signal generated by hybrid 486 is a Loop Current Present signal on line 497. When this signal indicates loop current is not present, the caller has hung up.

There is a digital portion of board A that functions to communicate digital data back and forth between the CSU and PEU A board. Several shift registers are used to communicate data. The 8 data outputs on lines 484 of the 8 ring detectors are coupled to 8 parallel inputs as the RD1 through RD8 input signals to shift register 500. The shift register 500 is a parallel-in, serial-out shift register, with its serial output line 503 forming part of bus 414. Eight individual on/off hook logic signals like the on/off hook signal on line 496 are provided to the A board from the CSU via a serial-in, parallel-out shift register 502. Eight bits of input serial data to shift register 502 are provided via bus 414 and line 504. After these 8 bits are shifted in, they may be provided on 8 individual output lines such as line 506 as signals on/off 1 through on/off 8.

When a ring signal comes in on telephone line 450, the ring detector 482 generates a digital signal on line 484 indicating that a ring has occurred. This digital ring signal is transferred to the CSU via shift register 500 and bus 414. Any caller ID information is sent from the CO to the PEU via line 450 between the first and second rings. When the CSU detects the first ring, it signals the caller ID detect circuit 468 in FIG. 6 to arm and start looking for caller ID information.

Figure 9:
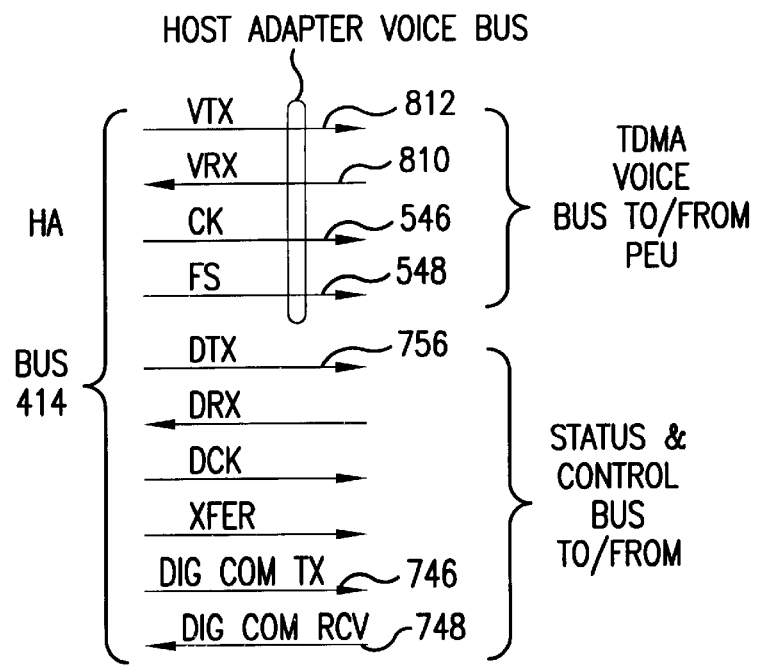
FIG. 9 a diagram of the conductors on bus 414 in FIG. 5 which connects PEU 410 to CSU 440.

Referring to FIG. 9, there is shown a diagram of the conductors on bus 414 in FIG. 5 which connects PEU 410 to CSU 440. Four conductors carrying signals VTX, VRX, CK (bit clock 546) and FS (frame sync 548) comprise a host adapter voice bus carrying voice data in digital form in timeslots using time division multiple access on the VTX and VRX lines. The VTX and VRX conductors carry time division multiplexed digital data in serial format for the transmit and receive portions of up to 32 separate conversations, one conversation per timeslot. The CK signal is a 2.048 MHz bit clock to keep the VTX and VRX signals synchronized and the FS signal is a frame synchronization signal to allow the receivers to reassemble the data packets in the individual timeslots correctly.

A status and control bus is comprised of six more conductors carrying DTX, DRX, DCK and XFER signals, and two digital communication lines. The digital communication lines carry data from the phones to the host adapter which indicate which keys were pressed and carry digital data to the phones such as call preview data and signals to light lights or do other user interface functions. The XFER signal is a hardware handshake signal that tells the shift registers that transport status and control data on the status and control bus to shift data in or shift data out their outputs as required. DTX and DRX carry the send and receive digital data and the DCK is a data clock signal which clocks data in and out of the shift registers.

Figure 10:
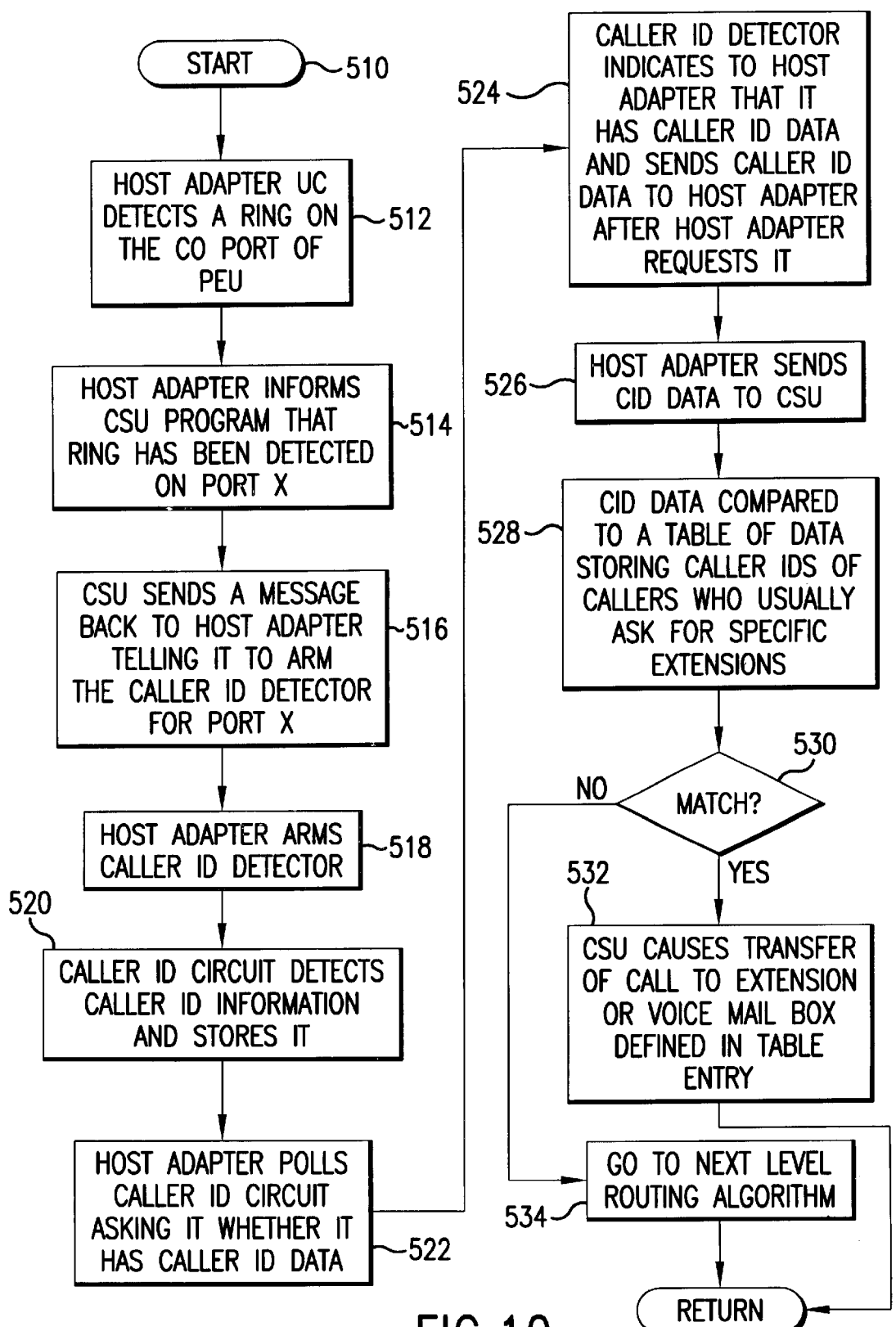
FIG. 10 is a flow diagram of the new process of caller ID routing to the appropriate extension phone based upon caller ID information of the incoming call.

The process of caller ID routing is shown in the flow chart of FIG. 10. The process starts at 510 and, in step 512, the host adapter microcontroller detects the fact that a ring signal is coming in from the CO on some port of the PEU. This process is usually carried out by scanning the data on bus 414 arriving from shift register 500. The host adapter then informs the CSU program in step 514 that a ring has been detected on Port X where Port X is the particular PEU port which received the ring signal. In some embodiments, this is done by generating an interrupt, and, in others, it is done by polling. In the preferred embodiment it is done by sending an IDA bus packet comprised of a command byte and a data byte. Interrupts are preferably used in both directions. Typically, communication from the host adapter to the CSU is done by writing a command byte and a data byte to the interface registers on the host adapter card 452 in FIG. 5 and then activating an interrupt signal. The CSU interrupt service routine then reads the command and data bytes from the registers and sends a packet and interrupt back to the host adapter acknowledging that it has read the information. Communication from the host adapter to the CSU typically takes the form of the host adapter writing a command byte and data byte indicating for example, "I have detected a ring on Port X". An interrupt is then activated and the CSU reads the command and data bytes to learn of the ring on Port X and sends back an interrupt to the host adapter acknowledging the receipt of this information. The CSU then executes code which sends a message back to the host adapter telling it to arm the caller ID detector circuit 468 for Port X, as symbolized by step 516, and the host adapter acknowledges the command.

In step 518, the host adapter sends a signal to the caller ID detector assigned to Port X to arm it. The caller ID circuit then looks for the caller ID information between the first and second ring and, upon detection thereof, stores it in step 520. In step 522, the host adapter polls all the caller ID circuits to determine which of them, if any, have caller ID information stored. The caller ID detection circuit assigned to monitor Port X replies to the host adapter in response to the polling request that it has caller ID information stored in step 524, and responds to a command from the host adapter to send the caller ID information by sending it to the host adapter. The host adapter then sends the caller ID information to the CSU process in step 526 via the ISA bus for use in whatever function for which it is needed such as routing the call to the proper extension based upon the caller ID information. We assume for the purposes of this application that the CSU algorithm uses the caller ID (CID) data to do automatic routing.

In step 528, the caller ID data stored in the CSU memory is compared to a table listing the caller IDs for all callers that typically call certain extensions. If there is a match found in step 530, the CSU causes the call to be routed to the extension or voicemail box of the person the calling person is listed in the table as usually calling in step 532. After step 532 is accomplished, the caller ID routing algorithm is completed. If the caller does not want to talk to the person to whom her call is automatically routed, she has several options. She can ask the person to transfer her to whoever she does want to talk to if the person picks up the phone. If instead, she get his voicemail, she can dial the extension number of the person she does want to talk to during the prefatory announcement of the voicemail, or, if she waits until after the beep and finds herself in record mode, she can press the # key to stop the recording and get more dialing options or she can press the 0 key and get transferred to the attendant. In DTMF mimic recognition embodiments where the DTMF tones and mimics thereof are recognized during the recording process and erased from the recording, the # or 0 DTMF commands will be recognized and erased from the voicemail recording, but they will still cause more dialing options to be presented or transfer to the operator, respectively.

If there is no match, the CSU moves on to processing in a next level down routing algorithm in step 534. The next level down of routing has been in public use for more than one year, but basically, this routing algorithm may route the CO port to a fixed extension port such as the attendant or provide the caller with options to dial an extension number, opt for voicemail etc.

The hardware that accomplishes the call transfer is centered on the switch card in the CSU. Assuming that the incoming call is an analog signal on CO line 450 in FIG. 5, the analog signals on the tip and ring lines is converted to digital data by transfer inside PEU 410 from card A to card C. There, the incoming voice signals are converted to digital data and sent via the VTX lines of bus 414 to the host adapter card 452 in FIG. 5. The host adapter transfers the data to the switch card via bus 535 in FIG. 5. Bus 537 couples the A, B and C cards of the PEU together in FIG. 6.

Figure 11:
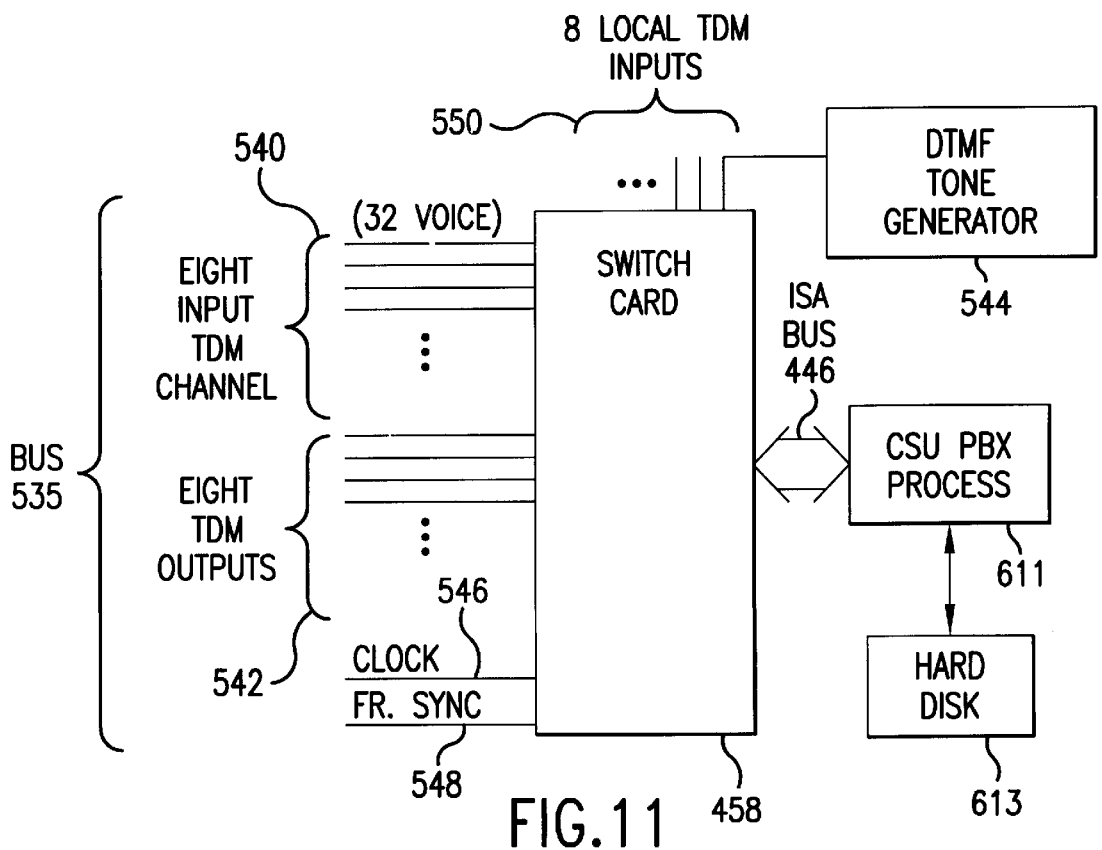
FIG. 11 shows a diagram of the inputs and outputs to the switch card C in FIG. 6.

Referring to FIG. 11, there is shown a diagram of the inputs and outputs to the switch card C in FIG. 6. The bus 535 is coupled to the switch card by eight time division multiplexed inputs 540 and eight time division multiplexed outputs and clock and frame sync inputs. A DTMF tone generator 544 of known structure is also coupled to the switch card to generate DTMF tones for dialing, ring signals, busy signals etc. used for user feedback on call progress or so-called ring back signals. Bus 535 also includes a 2.048 MHz bit clock signal on line 546 and a frame synchronization signal on line 548 which synchronizes all frames. The bit clock synchronizes each channel also. Each of the 8 TDM inputs and outputs can carry up to 32 channels of voice conversation simultaneously such that even if two PEUs are ganged together and all 8 CO ports are in simultaneous use, the total of 16 CO ports times two sides of every conversation makes 32 channels, all the data of which can be carried on the 32 timeslots of one of the 8 TDM inputs or outputs or both thereby still leaving a large capacity for internal conversations from extension to extension. The switch card also has 16 more input lines each of which has 32 timeslots which are used for local communications and are not part of bus 535.

The switch card has a switch chip which can couple any timeslot on any input line to any timeslot on any of the output lines. The switch card is controlled by the CSU process to make the appropriate connection when appropriate in the transfer process.

Figure 12A:
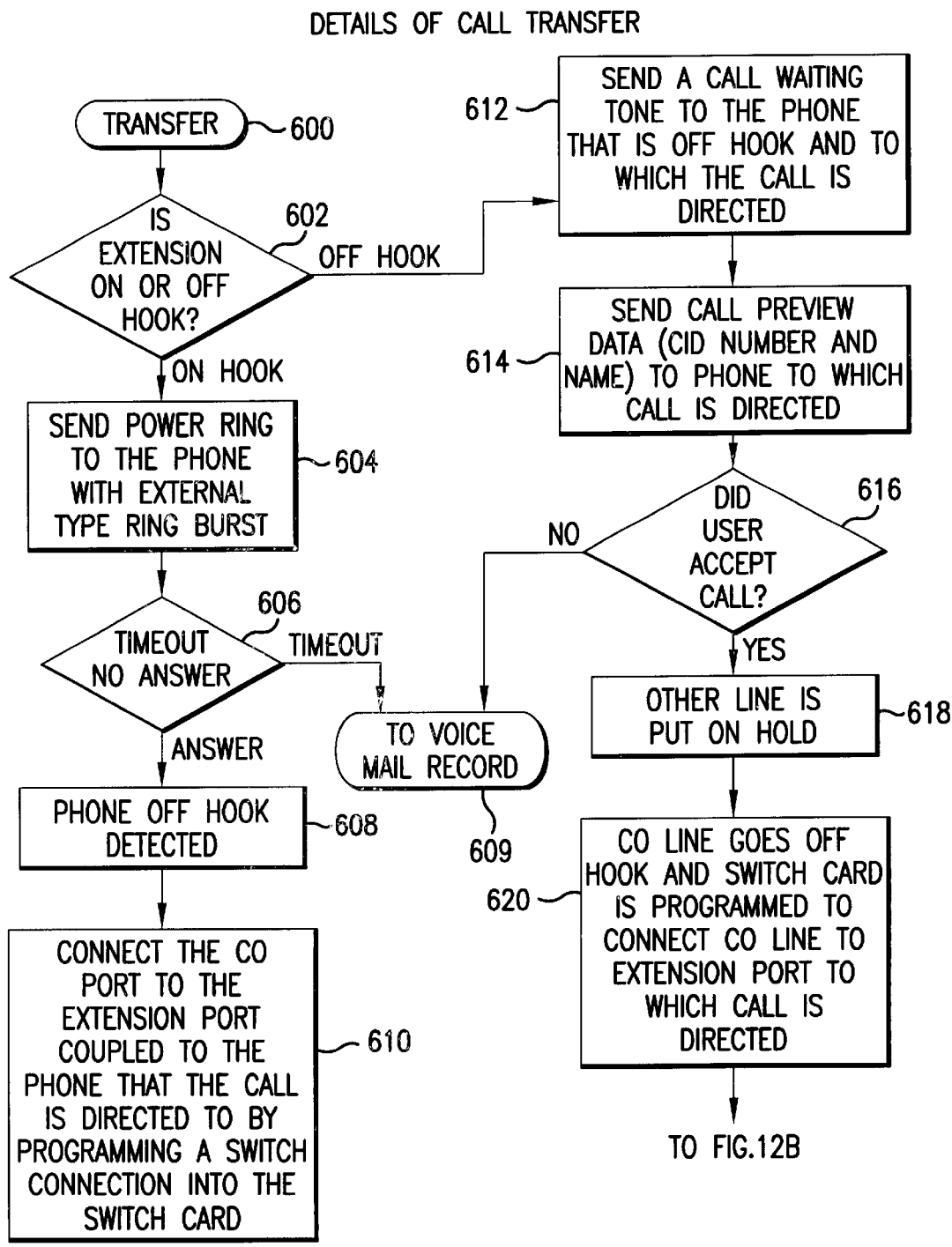
FIGS. 12A and 12B, taken together, comprise a flow chart of the process of transferring a call to the appropriate extension represented by block 532 in FIG. 10.
Figure 12B:
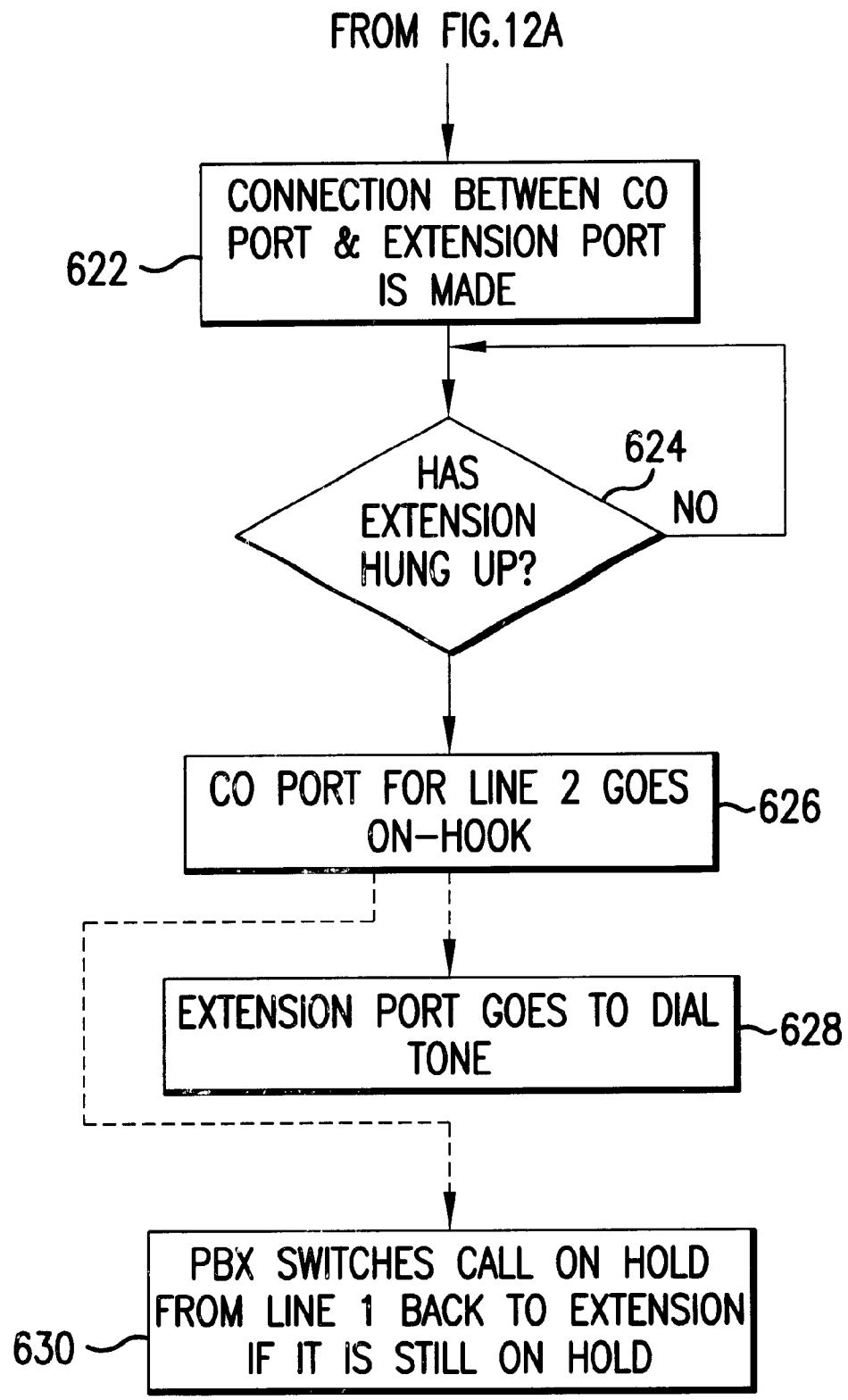

FIGS. 12A and 12B, taken together, comprise a flow chart of the transfer process represented by block 532 in FIG. 10. The process starts at block 600. Block 602 is a test to determine whether the extension is on or off hook. The extension only ports are all on board B of the PEU. This board will be described in more detail later, but suffice it to say that it has a hybrid circuit for each port which senses the on or off hook status of the extension phone for that port. This status is converted to a digital logic level and transferred to the host adapter via bus 414. Typically, the CSU keeps a table in memory with the on-hook or off-hook status of each extension stored in it. Whenever a change occurs, the table is updated. The on-hook or off-hook status of each extension is included in one or more data bits of a serial stream of bits transmitted by a parallel-in, serial-out shift register on board B coupled to the hybrids assigned to all the ports to which that particular board B connects. Test 602 samples this status information from the table.

If the extension phone to which the call is directed is on-hook, the CSU sends a command to the host adapter 452 in FIG. 5 to generate a power ring tone command and send it to the extension phone to which the call is directed. The PEU receives the power ring tone command and generates a power ring tone and sends it out to the extension phone. This process is symbolized by block 604 in FIG. 12A.

Step 606 in FIG. 12A is a test to determine if the external ring tone has been ringing for a time longer than the time out interval. If it has, the CSU PBX process 444 in FIG. 11 sends command packets to the switch card 458 to cause it to set up a connection between the CO port of the PEU and the voicemail box for the person assigned to the extension phone which did not answer. This is done by taking the data from the timeslot assigned to the CO port of the PEU upon which the call arrived on one of the eight TDM inputs 540 in FIG. 11 and placing it in whatever timeslot on one of the eight TDM outputs 542 that is assigned to that person's voicemail box. One of the TDM output lines 542 is coupled to a digital signal processor (not shown) on the switch card 458 in FIG. 11 which is programmed to record voicemail messages, remove any DTMF tones or DTMF mimics from the recording and store the data on a hard disk or other memory 613 by transferring it to the CSU process which stores it on hard disk.

Step 608 represents the process of determining that the called party answered by virtue of his or her phone going off-hook.

Block 610 represents the process of causing a connection between the PEU port coupled to the CO via the phone line on which the incoming call arrived to the PEU port to which the extension being called is connected. This process entails the steps of converting the incoming voice to digital data in the PEU, transmitting it to the host adapter and then to the switch card, ordering the switch card to take the data out of the timeslot in which the incoming data from the CO is arriving at the switch card and putting it in whatever timeslot is assigned to transmitting data to the extension phone to which the call is directed. The incoming data is then transmitted in the assigned timeslot over bus 414 to the PEU where it is converted to analog signals and coupled to the proper port to which the extension phone is connected and transmitted to that phone over bus 416. Voice signals in analog form coming from the extension phone are transmitted back to the PEU over bus 416, converted to digital data in the PEU and put in another timeslot assigned to return signals and transmitted via bus 414 to the host adapter and then to the switch card. The switch card takes this data out of the return timeslot and puts it into whatever timeslot is assigned to return data to the CO and transmits the data through the host adapter to the PEU over bus 414 where it is converted to analog signals on board C and coupled through board A to the port coupled to the CO via the telephone line on which the incoming call arrived.

Returning to step 602, if the extension is off-hook, step 612 is performed to send a call waiting tone to the phone to which the call is directed that is off-hook. This is done by the CSU process sending a command to the DTMF tone generator 544 coupled to the switch card 458 in FIG. 11 telling it to generate a call waiting tone. This data is put into the timeslot dedicated to data being sent to the particular extension to which the call is directed. The data is then transmitted to the extension by the same process detailed above for sending voice data to the phone.

Step 614 is then performed to send call preview data to the extension. The call preview data is the caller ID number and name, if any,. from the incoming call. If the extension is coupled to a Dash phone (Picazo Communications was formerly known as Dash) or to a PCOM card 426 or PCCL card 430, it is possible to preview a call on a display either on the Dash phone or on the display of the computer to see who is calling when a call waiting tone is heard. On a regular phone, this is not possible, so the user either depresses the switch hook to take the new call or ignores it. In step 616, the CSU process determines if the user accepted the call or not.

If the extension which received the call waiting tone is either a Dash phone or any other station equipment such as the PCOM or PCCL card, the process of accepting the call is different. Thus, test 616 has different processing branches which are intended to handle any situation with regard to which type of phone or station equipment is coupled to the extension. If the user is using a Dash phone, the user can preview the waiting call by pressing the line 2 button once. This brings up a display of the name and number sent in step 614. In the case of PCOM or PCCL, the user gives a preview command on his keyboard to bring up a display of the caller ID data. If the user decides to accept the call on a Dash phone, the line 2 button is pressed again. If the user decides to accept the call on station equipment such as a PC coupled to the extension line via the PCOM or PCCL cards, the user gives an accept command. These commands are stored in buffers in the Dash phone or station equipment. The CSU periodically polls all the extensions to determine which commands have been given. This is done by sending a command packet to the host adapter telling it to poll the extensions. The host adapter sends out inquiry packets to each extension via the bus 414 and the T1 and R1 digital lines of bus 16. When these inquiry packets arrive at each Dash phone or station equipment, the contents of the command buffer, if any, or a null response is sent back to the host adapter in a reply packet. The host adapter then stores the reply packet in memory and generates an interrupt to the PBX process. The interrupt service routine then reads the stored data and returns it to the PBX process. If the data shows that the user of a Dash phone has pressed line 2 twice or that the user of station equipment has given the command to receive the call, the PBX process proceeds to step 618.

Step 618 represents the process of putting the original line (hereafter line 1) on hold. This is done by connecting the port coupled to the CO by the telephone line carrying the original call to a source of a hold message such as music, promotions etc. This is done in the manner described above simply by the CSU central process sending a command packet or packets to the switch card instructing it to connect at least the outgoing timeslot for data to the CO on line 1 to a timeslot carrying the hold message data and transmitting this data to the PEU as described above for conversion back to analog signals and coupling to the CO port coupled to line 1.

Step 620 represents the process of the CSU central process (hereafter the PBX process) starting to connect the new call on line 2 to the extension that indicated it wanted the call in response to the call waiting tone. This is done by sending a command to the hybrid on board A in the PEU coupled to the port to which line 2 is connected a command to cause it to go off-hook in step 620. Then, in step 622, the PBX process sends a command packet to the switch chip causing it to connect the timelsots of line 2 to the timeslots of the extension. These two switching events cause the following things to happen. When the CO port goes off-hook, the PEU then receives incoming voice signals and converts them to digital data and sends them to the host adapter via whatever timeslot on bus 414 which is assigned to incoming data. The PBX process may also optionally play a prerecorded message out on line 2 like, "One moment please while your call is being connected". This is done by accessing the digital data encoding the outgoing message and placing it in the timeslot assigned to outgoing data for the port coupled to line 2. The PBX process command packet to the switch chip causing it to couple line 2 to the extension causes data from the incoming and outgoing data timeslots for line 2 to be transferred from and to the outgoing and incoming timeslots, respectively, for the extension to which line 2 is to be connected, as those skilled in the art will appreciate. The other processing that occurs in the process of connecting line 2 to the extension is as described above.

The call then proceeds until it is terminated. When one of the conversants hangs up, the PBX process discovers that fact in step 624, and step 626 is performed wherein the PBX process sends a command to the hybrid on board A of the PEU port coupled to line 2 to cause it to set an on-hook condition for the line 2 tip and ring lines. Then, in step 628, the PBX process orders the DTMF tone generator to generate a dial tone and sends a command packet to the switch card 658 commanding it to connect this dial tone to the extension phone.

In an alternative embodiment, when the user hangs up or presses the line 1 button again or gives a "resume call 1" command on his or her station equipment, this fact is sensed by the PBX process, and line 1 is reconnected to the extension so that the call on line 1 can be completed, as symbolized by block 630.

Returning to step 616, if the user with his extension off-hook elects not to take the call, the PBX process sends a command packet to the switch chip to connect the timeslots of the incoming call on line 2 to the timeslots assigned to voicemail for that particular extension.

Referring to FIG. 13, there is shown a block diagram of the circuitry for one extension phone port on board B in the PEU 410 in FIG. 5. The extension phone or PCOM or PCCL station equipment is connected by bus 416 to a protection circuit 700. Analog tip and ring lines T and R carry the voice signals while digital T1 and R1 lines carry digital data for use by either a Dash phone or station equipment. The protection circuit is coupled to a power ring circuit which has an input 704 and an output 706. A Control input signal on line 704 tells the power ring circuit whether or not to ring the phone. An Off Hook During Ring status output on line 706 is a digital signal which is sent to the host adapter in the CSU to tell it that the extension phone or station equipment picked up during the power ring. The digital Control input signal on line 704 is sent to the power ring circuit 702 via the status and control portion of bus 414 and shift register 712. The Control signals for each port on board B are sent from the CSU to shift register 712 in serial form and are output in parallel form to all the power ring circuits like 702 simultaneously. Upon activation of the Power Ring Control signal on line 704, the Power Ring circuit 702 generates a high power ring signal which is sent out to the extension telephone via the analog tip and ring lines to cause the extension phone to ring.

The Off Hook During Ring signal on line 706 is sent to the CSU, as are similar signals from the other ports, via shift register 710 and bus 414.

The power ring circuit is coupled to a 2-wire-to-4-wire conversion hybrid 714. This hybrid converts the bidirectional analog signals on pair 720 to unidirectional analog signals on TX pair 716 and RX pair 718. Pairs 716 and 718 are coupled to board C for digital-to-analog conversion and an analog-to-digital conversion, as appropriate depending upon the direction of flow of data. Hybrid 714 generates a single bit Off Hook Status signal on line 722 which is sent to the CSU via shift register 708 and bus 414. The Off Hook Status signal on line 722 tells the PBX process in the CSU that somebody has just picked up the extension phone whereas the On/Off Hook status signal on line 496 in the board A block diagram of FIG. 8 is controlled by the PBX process to take the CO telephone line off hook.

Two digital lines T1 and R1 on bus 416 couple the extension phone or CTI station equipment to a conversion circuit 740. This circuit functions to take Digital Receive and Digital Transmit signals from the status and control bus on line 742 and 744, respectively, and puts them on the T1 and R1 lines with a known protocol and packet type. The data on lines 742 and 744 arrives from the host adapter of the CSU 440 via the Digital Corn TX line 746 and Digital Corn Receive line 748 within bus 414 on FIG. 5. These digital communication lines 746 and 748 are used to send and receive data to/from one port at a time using a multiplexer 750 and shift register 752. The shift register 752 has three parallel outputs 754 which are coupled to the select inputs of multiplexer 750. The shift register outputs 754 control which of the multiple Digital Receive inputs like line 742 received from the various ports is coupled to Digital Corn Tx line 746 and which of the multiple Digital Xmit lines 744 from the various ports are coupled to Digital Corn Receive line 748. The selection criteria data is sent to the shift register 752 via the DTX line 756 of bus 414 in serial form.

The DRX, DCK and XFER lines in FIG. 9 which form part of the status and control bus portion of bus 415 are used to monitor status of the following signals: Ring Detect status for CO line on line 484 in FIG. 8; On/Off Hook status for the extension phone or station equipment on line 722 in FIG. 13; Off Hook During Ring status for the extension phone on line 706 in FIG. 13; Port Type (CO or extension) on line 762 from shift register 760 in FIG. 13; tone identity and tone valid status for DTMF signals from all 16 PEU ports; Loop Current Present on line 497 in FIG. 8; Digital Ring signal on line 484 in FIG. 8 indicating when a CO line is ringing.

The DTX, DCK and XFER lines in FIG. 8 are used to control the logic level of the following signals thereby controlling certain events: CO line Off Hook on line 496 in FIG. 9; Power Ring Control on line 704 in FIG. 13 controlling power ringing of an extension or station equipment; and port selection for the Digital Corn TX and Digital Corn Receive lines 746 and 748 on FIG. 13.

The status and control portion of bus 414 is divided into timeslots, with one or more timeslot dedicated to each particular port. This allows the PBX process of the CSU to monitor digital status of each CO or extension port and to send digital control data to all CO and extension ports so as to operate the phone system.

In an alternative embodiment, the data on the digital communication lines 746 and 748 in FIG. 10 could be put in additional timeslots on the DTX and DRX lines such that the digital communication lines 746 and 748 could be eliminated while retaining the functions carried out by the data transmitted thereon.

Figure 14:
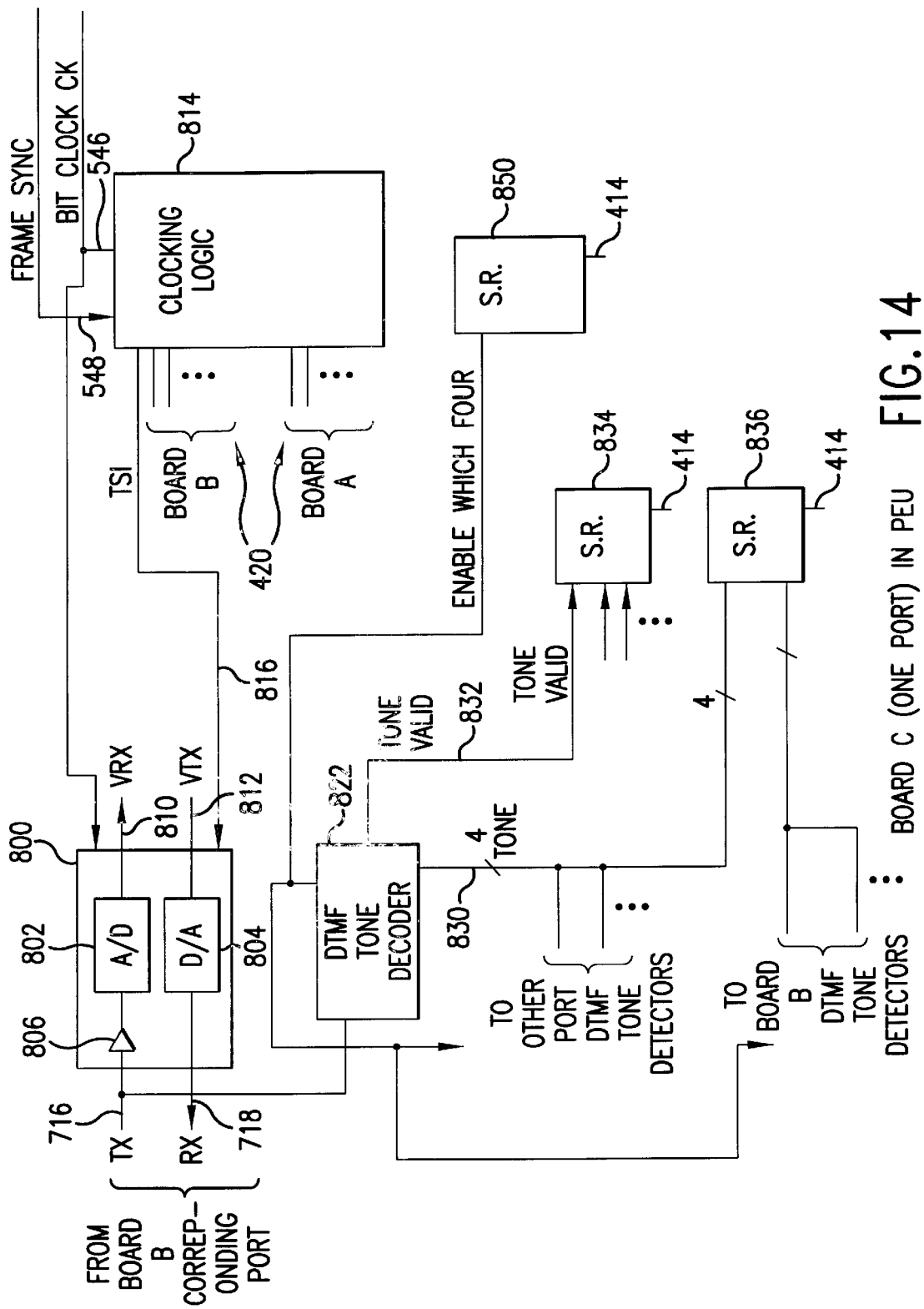
FIG. 14 is a block diagram of the circuitry on board C in the PEU for one port.
Figure 15:
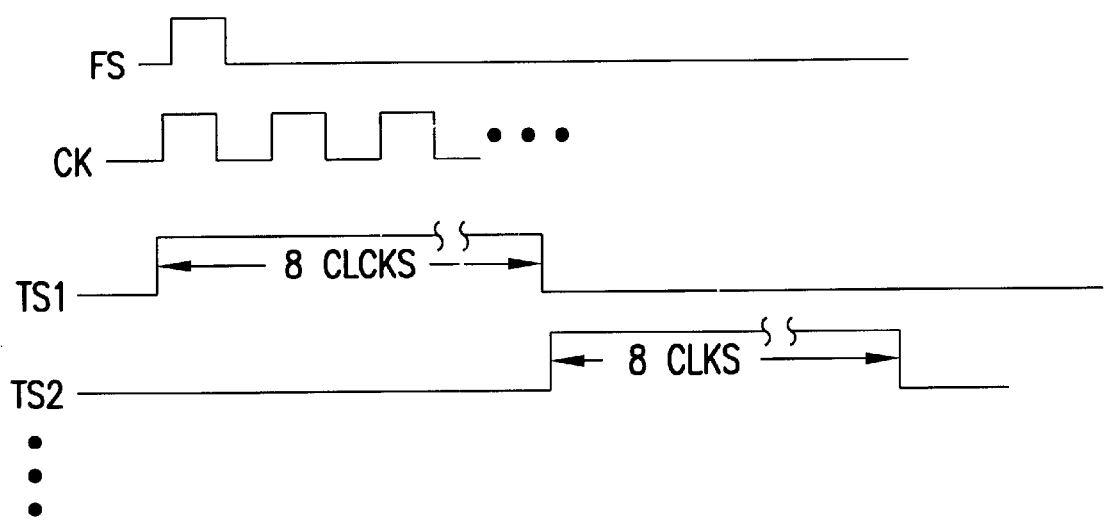
FIG. 15 is a timing diagram that shows the relationship between the frame synchronization signal FS and the bit clock signal CK and the various timeslot control signals TS1, TS2 etc.

Referring to FIG. 14, there is shown a block diagram of the circuitry on board C in the PEU for one port. Board C has a codec 800 with an analog-to-digital converter 802 and a digital-to-analog converter 804 and an amplifier 806. The codec 800 is coupled to the hybrid on board B or board A of the corresponding port by a TX line 716 and a RX line 718. The TX line is coupled to the A/D converter to convert the analog signal from amplifier 806 to digital data on a VRX line 810. The codec 800 is coupled to TDM multiplexing circuitry in the form of clocking logic 814 which is also shared by the codec circuitry for all the other ports as well. The function of the clocking logic is to use the bit clock signal on line 546 and the frame synchronization signal on line 548 to generate a control signals that tell each codec when to output its next byte of voice data on line VRX and when to input its next byte of input data on line VTX. The control signals define the timeslots dedicated to each port and tell the codec when their timeslot is happening. A TS1 signal on line 816 is the control signal that tells codec 800 when its timeslot is occurring and causes the codec to put the received data on VRX into the proper timeslot on bus 414 and to take data off bus 414 as the VTX data on line 812. The Bit Clock signal on line 546 also supplies a clock for the converters in codec 800 and for clocking logic 814. The timeslot control signals for the other ports are shown generally at 420. A timing diagram that shows the relationship between the frame synchronization signal FS and the bit clock signal CK and the various timeslot control signals TS1, TS2 etc. generated by clocking logic 814 is shown in FIG. 15.

Each port also includes a DTMF tone decoder 822 which takes the analog signals received on line 716 from the CO or extension port and decodes any DTMF tones in these signals. The identity of the DTMF tone is output as four bits on bus 830 which is shared by the other DTMF tone detectors for the other ports. Each DTMF tone detector has a tristate driver on its Tone output. A shift register 850 serves to enable the DTMF tone detectors in a polling sequence. The polling sequence data is received from the status and control portion of bus 414. The polling data loaded serially into shift register 850 is output in parallel form and enables only the DTMF tone detectors whose output data is to be read at any particular time.

The DTMF tone detector also outputs a Tone Valid signal on line 832 which is input to a shift register 834. The Tone Valid signals of all the other DTMF tone detectors for the other ports comprise the rest of the inputs for the shift register 834. This shift register has its serial data output coupled to the status and control portion of bus 414. The four bits of the Tone signal on bus 830 are loaded into a shift register 836. The Tone signals from the DTMF tone detectors of the other ports comprise the other inputs of the shift register 836, and its serial data output is coupled to the status and control portion of bus 414.

Figure 16:
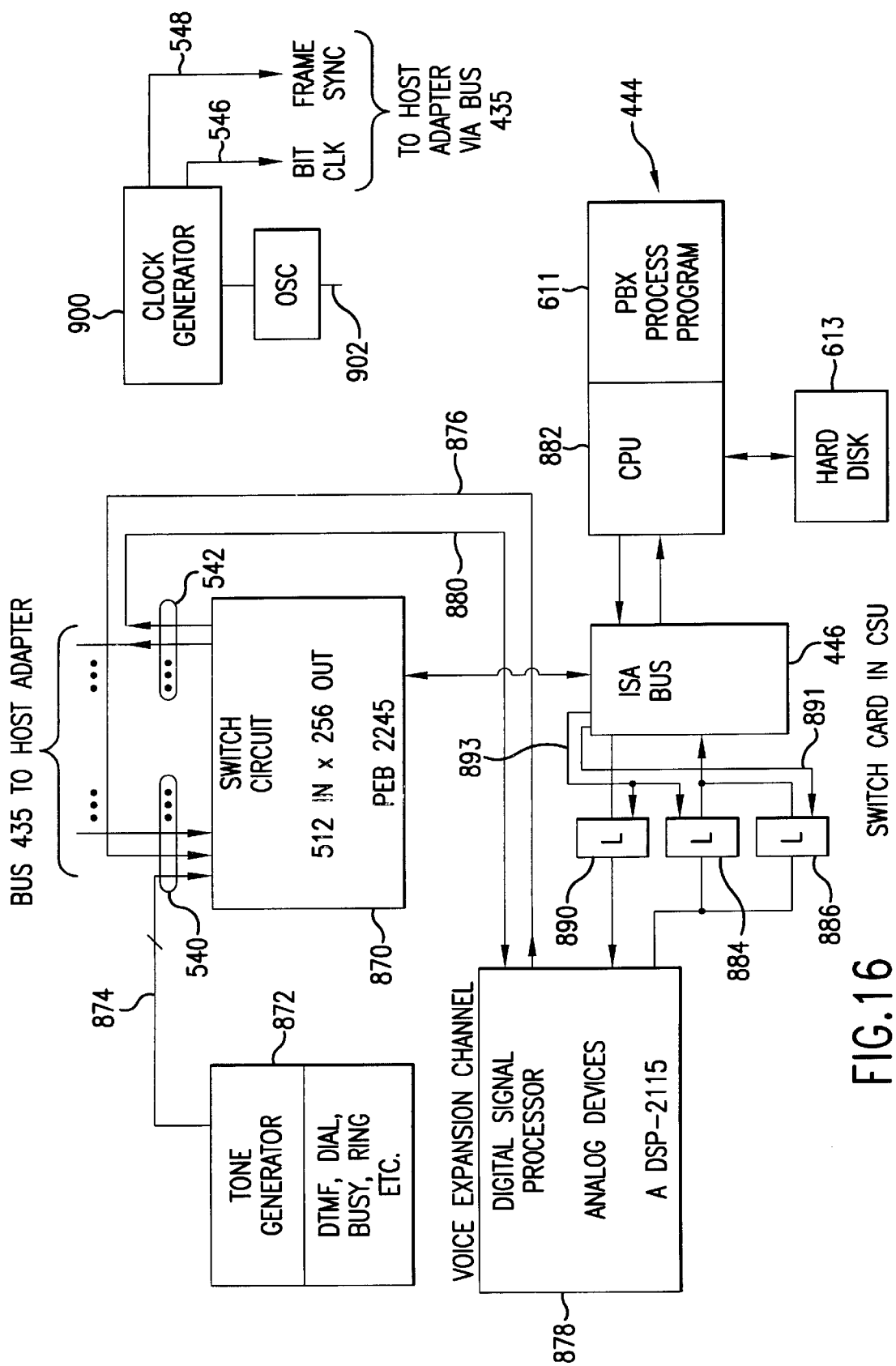
FIG. 16 is a block diagram for the switch card circuit 458 in FIGS. 5 and 11.

Referring to FIG. 16, there is shown a block diagram for the switch card circuit 458 in FIGS. 5 and 11. A switching integrated circuit (PEB 2245) 870 (hereafter "switch chip") performs the function of transferring data between timeslots coming in from the extensions to timeslots which are outbound for other extensions or the CO and vice versa. The switch chip 870 has 16 individual inputs that form a time division multiplexed input channel 540 and 8 outputs that form a time division multiplexed output channel 542. Each of the 16 input lines to the switch chip has 32 input timeslots, and each of the 8 output lines has 32 output timeslots. The switch chip can connect any timeslot to any other timeslot and can connect one timeslot to all timeslots for broadcasts such as paging.

A tone generator circuit 872 functions to generate DTMF tones, dial tones, busy tones, ring tones etc. These tones, in digital format, are coupled via bus 874 to one of the inputs of the TDM input channel 540 of the switch chip. The DTMF tone generator basically generates 32 different tones and puts each tone into a different timeslot on bus 874. Thus, the switch chip 870 can be controlled by microprocessor 882 running PBX process 444 via ISA bus command packets on bus 446 to select any tone needed at any particular time by taking data out of the timeslot on bus 874 dedicated to that particular tone. With regard to control of the switch chip 870 by the PBX process, ISA bus 446 is shown as a block with individual lines running out to the various circuits on the switch card. Each such individual line represents a connection to the address, data and control signals of ISA bus 446.

One of the switch chip input buses 876 is coupled to a digital signal processor 878 functioning as a voice expansion channel to add voicemail capability to the system. Likewise, one of the switch chip output buses 880 is also coupled to the DSP 878. The switch chip can therefore couple any CO line or extension port to the DSP 878 by coupling the appropriate timeslots on the input and output lines coupled to the appropriate port to the appropriate timeslots on the input and output buses 880 and 876. The DSP 878 is programmed to recognize DTMF tones or DTMF mimics during the process of recording voicemail messages and eliminate them either immediately or mark them and go back later and erase them. The voice expansion unit 878 functions to record voice data on any timeslot which is coupled onto its input bus 880 and record this data after the DTMF recognition processing on hard disk 613 via the CPU 882 and the PBX process 444. This is done by the voice expansion channel taking data out of the appropriate timeslot on its input bus 880 and processing it to remove any DTMF tones or mimics, and then formatting the data into ISA bus packets and transmitting it to CPU 882 and PBX process 444 via latch 884 in a DMA process for recording on hard disk 613. Latch 886 is a control latch. The latches 890, 884 and 886, are, in addition to being coupled to the data path of the ISA bus, are also coupled to address and control signals of the ISA bus, as represented by lines 891 and 893. The PBX process takes the raw voice data transferred in this way and attaches header information and records it in a file on the hard disk. The voice data in the timeslots on buses 880 and 876 is just raw voice data since each port has a dedicated transmit timeslot and a dedicated receive timeslot so no header information is needed when connecting the bytes in these timeslots to assigned timeslots on buses 880 and 876.

The DSP 878 also functions to play prerecorded message data from the hard disk 613 such as voice mail announcements and put them onto its output bus 876 for coupling through the switch chip 870 to the CO telephone line or some extension. The PBX process aids performance of this function by requesting access to the file on the hard disk having the prerecorded message announcement data. The data is then moved off the hard disk and put into the memory of the CPU 882 and then moved through the ISA bus interface 446 and latch 890 via DMA transfer into the memory of DSP 878 as ISA packets. DSP 878 takes the packetized data out of its memory and reassembles the data into a format suitable for transmission to the switch chip in the appropriate timeslot on bus 876 in the proper sequence. The switch chip then takes the data out of the assigned timeslot from the DSP and puts it on the timeslot assigned to the destination CO or extension port. This data then flows over bus 53 in FIG. 5 to the host adapter 452. At the host adapter, the data from the appropriate timeslot on the appropriate output line from the switch chip is multiplexed into the appropriate timeslot on bus 414 and sent to board C of the PEU 410. There, it is received on the VTX line 812 on FIG. 14 for the appropriate port and converted to analog voice data and transmitted out on the RX line 718 for the appropriate port. Assuming the appropriate port is an extension port, from the RX line 718, the voice signal travels to the hybrid 714 on FIG. 13 for the appropriate port via bus 537 in FIG. 6 and is then sent out to the extension phone or station equipment via bus 416 in FIG. 5.

The process to record a voicemail message is the reverse of the above described process except that the DSP 878 finds any DTMF tones or mimics in the incoming data and eliminates them before sending the file to the PBX process for writing to the hard disk. The DSP 878 has the capability to record multiple voicemail messages on different timeslots on buses 880 and 876 simultaneously.

The switch card also includes watchdog timers (not shown) to reset the system if the software crashes, and a master clock generator 900 driven by an oscillator 902 to generate the bit clock signal on line 546 and a Frame Sync signal on line 548.

Figure 17:
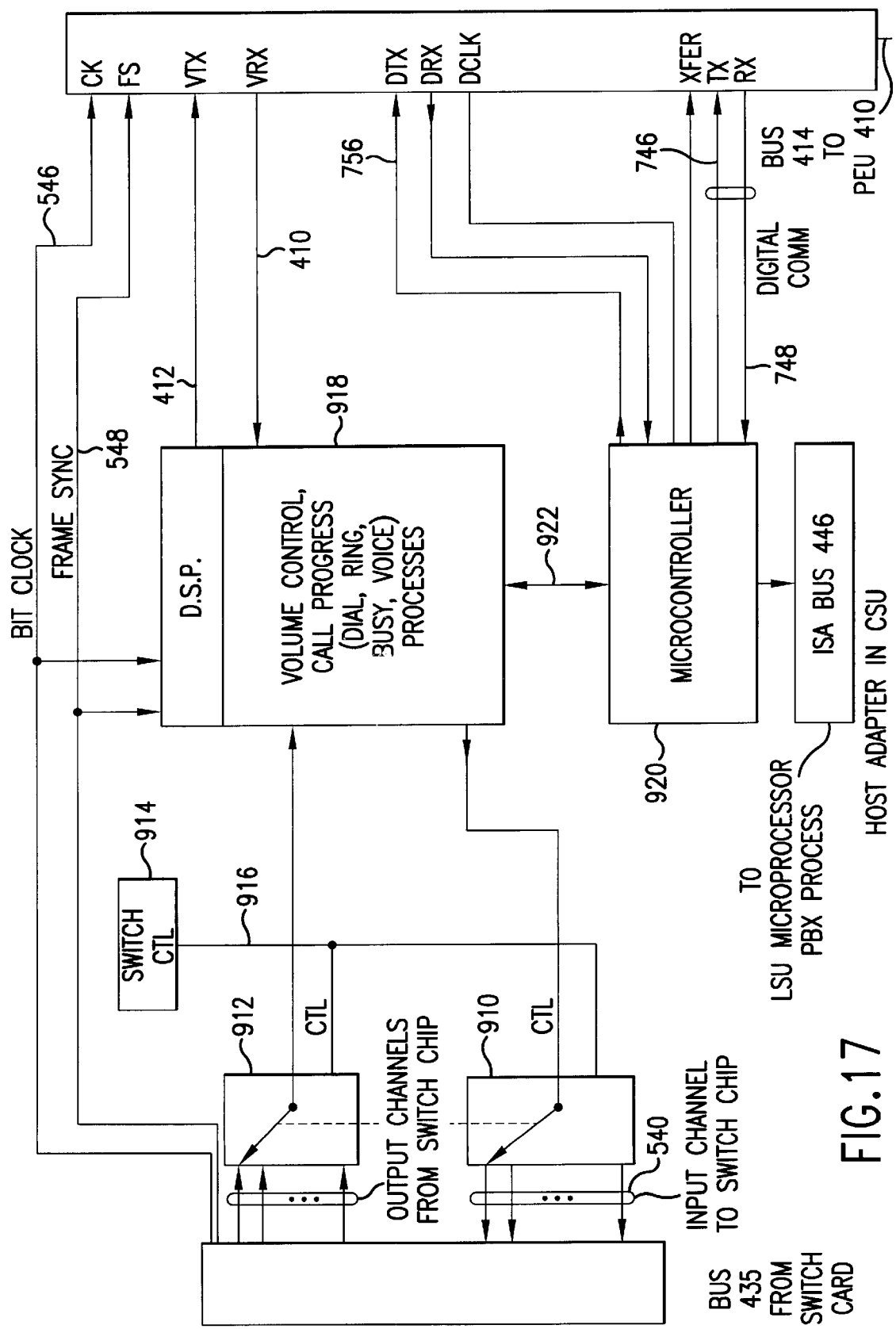
FIG. 17 is a block diagram of the host adapter in the CSU.
Figure 18A:
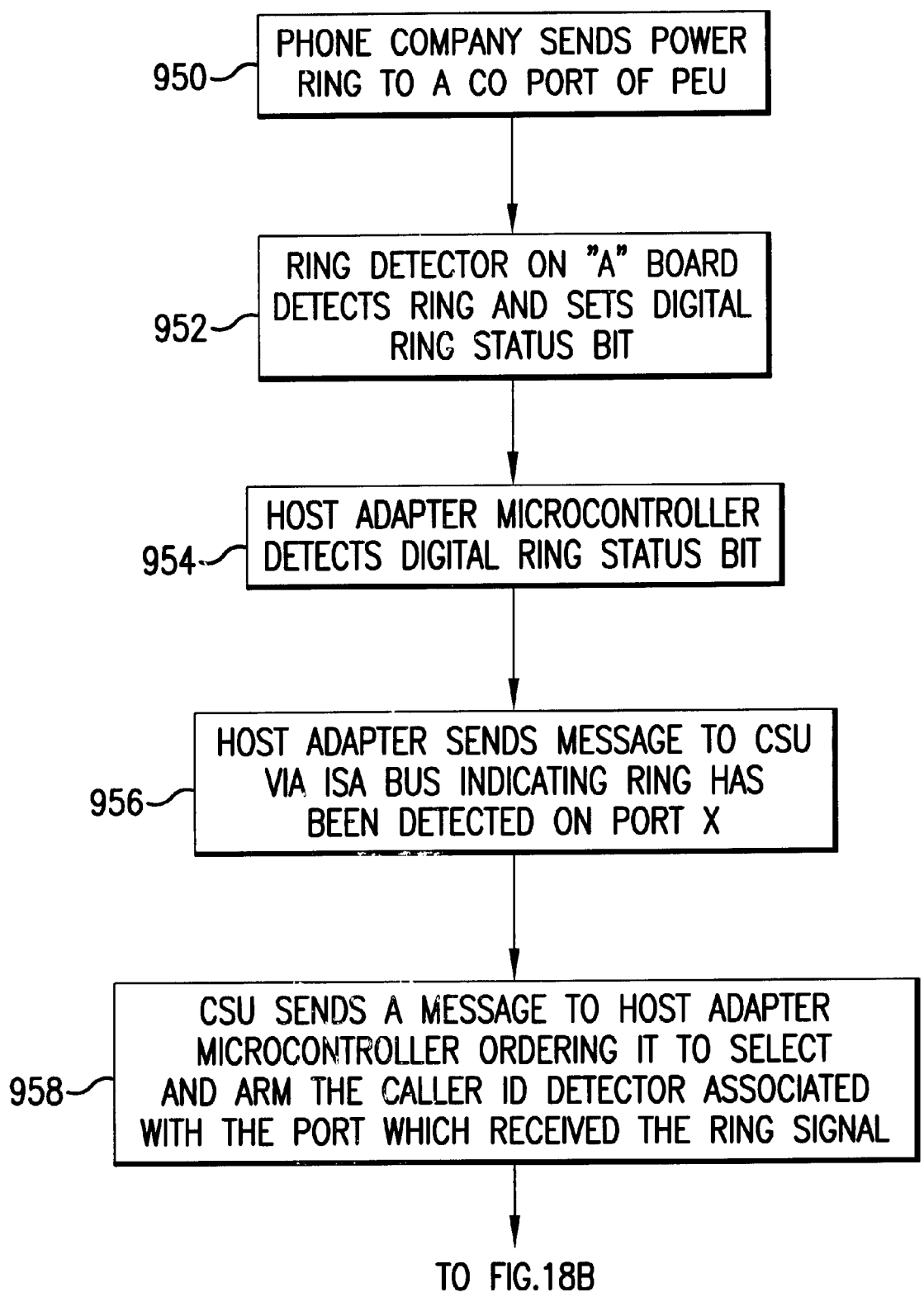
FIGS. 18A–18E illustrate a flowchart exemplifying the preferred species within the genus of the invention.
Figure 18B:
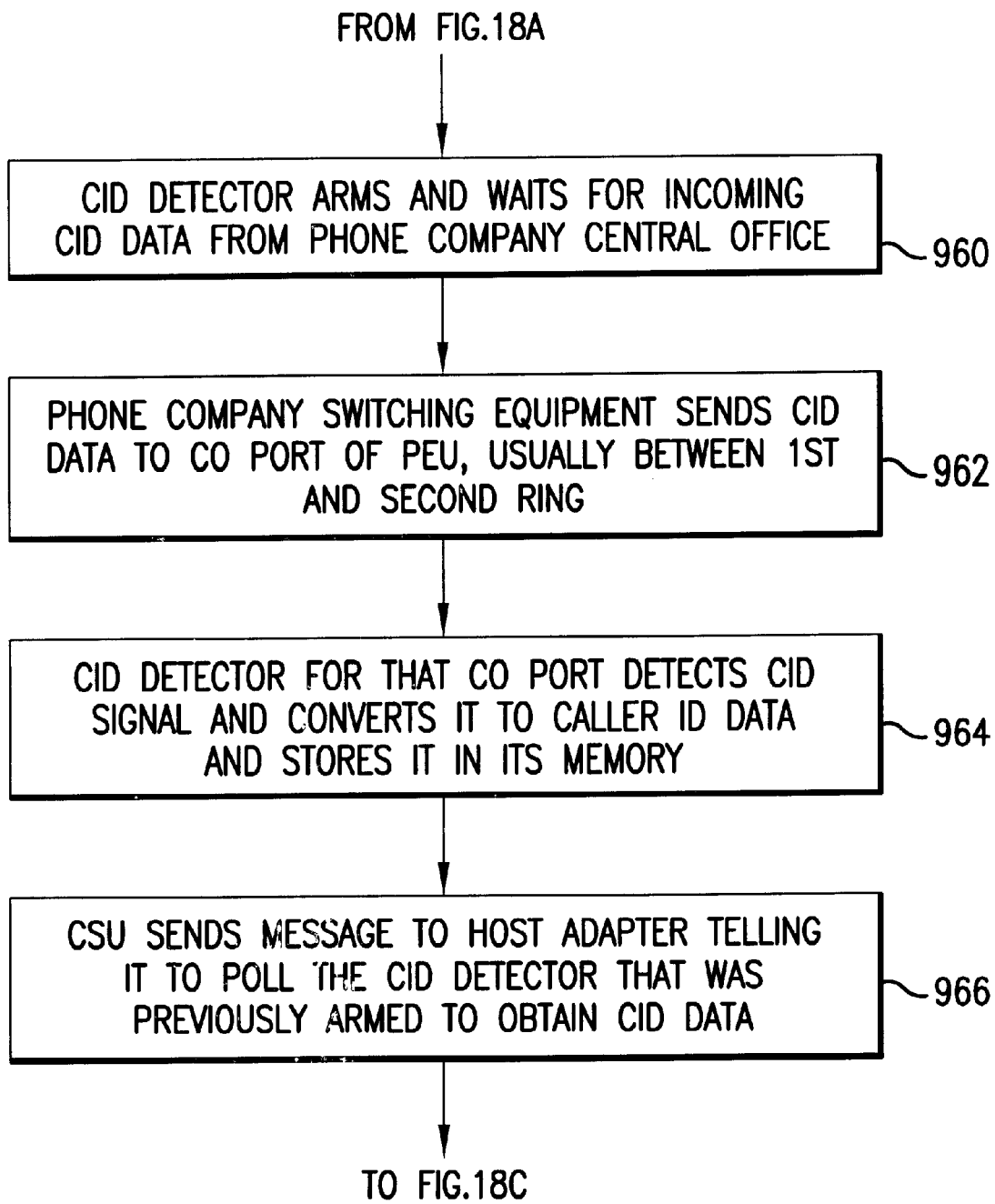
Figure 18C:
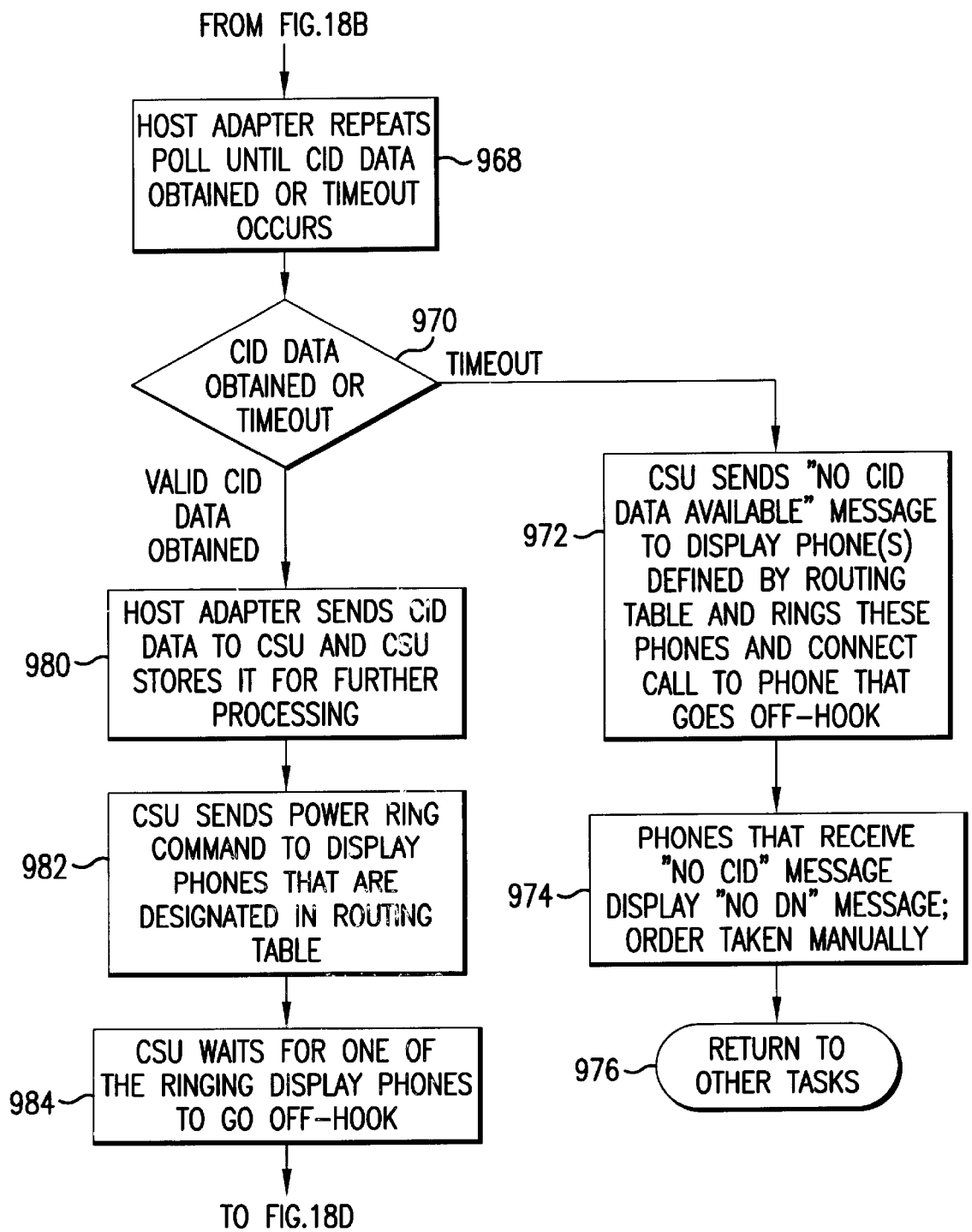
Figure 18D:
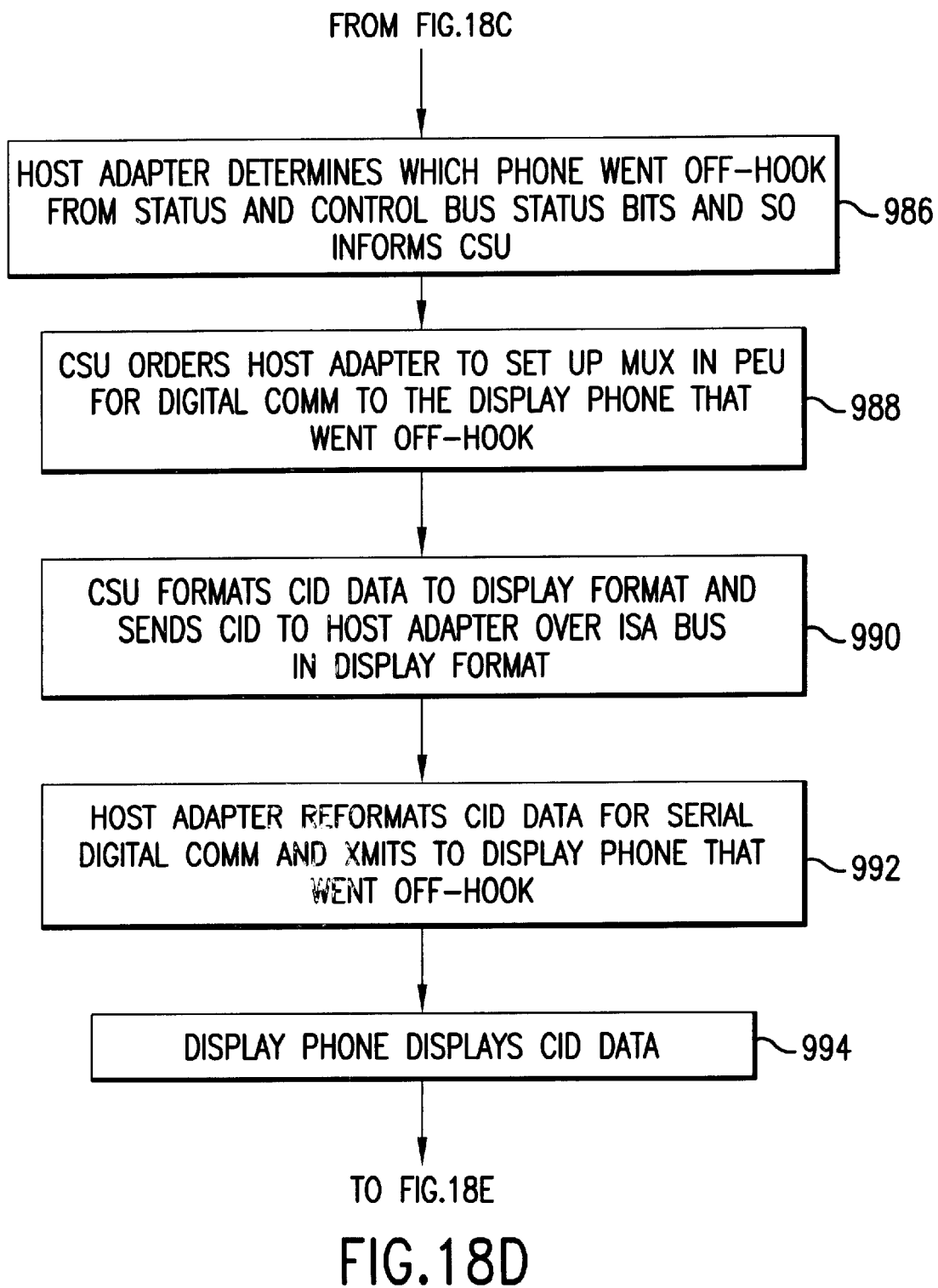
Figure 18E:
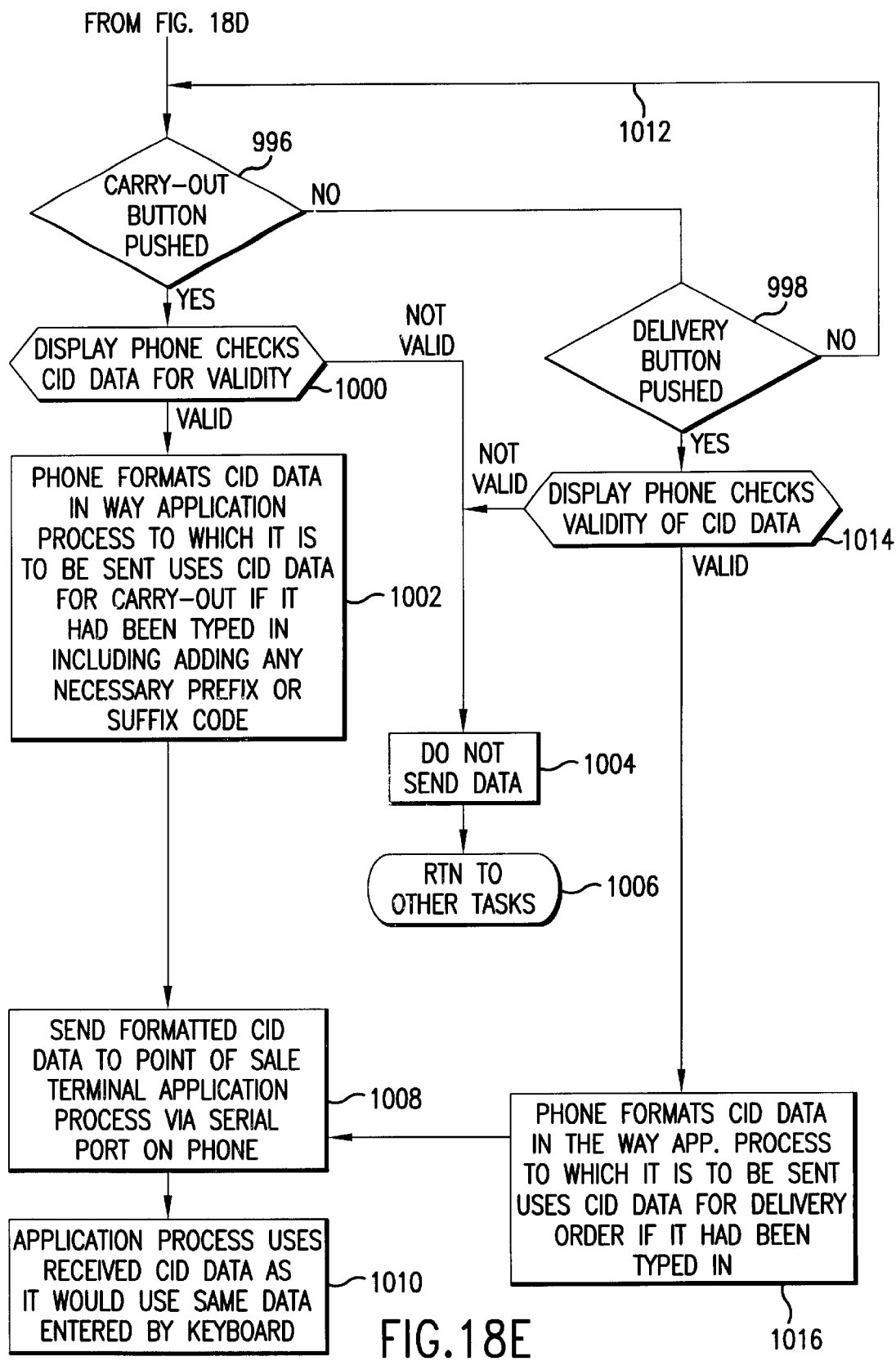

Referring to FIG. 17, there is shown a block diagram of the host adapter in the CSU. The host adapter is coupled to bus 435 such that seven of the eight input channels 540 of the switch chip on FIG. 16 are coupled to a switch 910, and seven of the eight output channels of switch chip 870 are coupled to switch 912. Switches 912 and 910 work as a pair under the control of switch control circuit 914 and a control signal on line 916. The function of the switches 912 and 910 is to pick one input channel and one output channel of the switch chip for coupling to a digital signal processor 918. Since each port has one channel comprised of a dedicated input timeslot and a dedicated output timeslot and since these timeslots must be on different input and output channels of the switch chip, the purpose of the switches 912 and 910 is to make sure the correct input and output channels of the switch chip for the particular conversation being processed are coupled to the DSP 918. Timeslot assignments are such that port 1 is on channel 1, timeslot 1 and port 2 is on channel 1, timeslot 2 all the way up to port 32 which is on channel 1, timeslot 32. Port 33 is on channel 2, timeslot 1. Each PEU is 16 ports for a total of 32 timeslots assigned to it. One host adapter can handle two PEUs because the PEUs can be chained together by an extension of bus 414.

The DSP 918 is programmed to perform various functions for each conversation in the 32 input and output timeslots to which it is connected. Those functions include volume control, call progress monitoring etc. The call progress monitoring involves determining whether voice data is present, whether there is a dial tone, ring signal, busy signal etc. The processed data is transmitted to and received from the PEU via the voice data lines VTX and VRX, 412 and 410.

The Bit Clock signal CK on line 546 and the Frame Sync signal FS on line 548 generated on the switch card simply pass from bus 535 to bus 414 for transmission to the PEU. These two signals are also coupled to the DSP 918.

A microcontroller 920 loads the program into the DSP 918 at powerup time and sends volume control commands to the DSP via bus 922 and receives call progress updates from the DSP. The volume control commands are static commands and do not currently implement automatic volume control. The microcontroller 920 is also coupled to the status and control lines DTX, DRX, DCLK, XFER, TX and RX and Digital Comm lines 746 and 748 of bus 414. The microcontroller 920 drives the control signals on the control lines of bus 414 in accordance with commands received from the PBX process 444 in FIG. 16 via command packets received over the ISA bus 446. Likewise, status information received over the status monitoring lines of bus 414 is formatted by the microcontroller 920 into ISA bus packets and sent via ISA bus 446 to the PBX process 444. If caller ID information or other digital data for the user interface needs to be sent to the phones themselves, the PBX process sends that data to the microcontroller in ISA bus packets which depacketizes them and sends the data to the phones via the Digital Comm lines 746 and 748.

Referring to FIGS. 18A through 18E, there is shown a flowchart exemplifying the preferred species within the genus of the invention. The process shown in these figures is carried out by the phone microcontroller 124 in FIG. 4 in cooperation with the host adapter microcontroller 920 in FIG. 17 and the CSU microprocessor 882 in FIG. 16 as a small part of the PBX process 444 in cooperation with the other circuitry discussed above needed to do the various functions described in the flowchart.

The process starts at block 950 representing the process of the phone company sending a power ring signal on a telephone line from the central office to a CO port of the PEU. Block 952 represents the process of the ring detector 482 on FIG. 8 detecting the ring signal and setting the Digital Ring status bit 484 to a state indicating a ring signal is being received. This status signal gets transferred to the host adapter 452 on FIG. 5 via bus 414 and shift register 500 on FIG. 8. Each CO port has its own ring detector, so the digital ring signal from each CO port forms one bit of the byte in shift register 500 which is transferred to the host adapter. This allows the host adapter to know which CO line is ringing and which caller ID detector associated with that line to use. The host adapter then sends a message to the CSU PBX process 444 indicating that a ring signal has been received on port X where X is the number of the CO port which is coupled to the ringing CO line, all as symbolized by block 956.

Block 958 represents the process carried out by the PBX process 444 of sending a message back to the host adapter microcontroller 920 requesting it to send a message to the caller ID detector/decoder board 468 to select and arm the caller ID detector circuit associated with the ringing CO line such as chip 478 on FIG. 7. The caller ID circuit is then activated and waits to detect caller ID signals and decode them into data, as symbolized by block 960.

In block 962, the central office switching equipment sends the caller ID data to the PEU, usually between the first and second rings. The caller ID signals are then detected and decoded into name and phone number caller ID data by the CID detector chip 478 associated with the ringing CO line 450 and stores the caller ID data in its memory temporarily, as symbolized by block 964.

The PBX process 444 knows that caller ID data may be arriving, so, in block 966, it sends a message to the host adapter microcontroller telling it to start polling the CID detector coupled to the ringing CO line to determine if it has any caller ID data to send. Block 968 symbolizes the process carried out by the host adapter microcontroller of continuing to poll the caller ID detector chip coupled to the ringing CO line to determine if it has decoded any caller ID data for a certain interval. At the end of that interval, either the caller ID data decoded from the caller ID signals will have been sent to the host adapter or a timeout will have occurred with no caller ID data having been sent. Test 970 symbolizes the determination of which of the two possible results has occurred and branching to the appropriate followup code. Polling is not the only way to obtain the caller ID data. Transfer of caller ID data can by an interrupt based mechanism or by any other interprocess data transfer mechanism such as by writing the data to a known address in shared memory address space and setting a flag indicating it is there.

If a timeout has occurred without any caller ID data having been obtained such as where the caller has his name and number blocked, the process of block 972 is performed. This represents the process of sending a "no CID data available" message to the display phones designated in a routing table to receive incoming calls from the central office. Typically, when the system of the invention is used in a business such as a restaurant that takes telephone orders such as a pizza restaurant, a certain phone or phones will be designated to receive all incoming calls on a certain CO port associated with the telephone number to call for orders. Which phones these are is designated in a routing table of configuration data. The process of block 972 represents the process of the CSU sending a control signal to all extension phones designated in the routing table to receive outside calls to cause them to ring and determine which of them goes off-hook and transferring the incoming call to the display phone that goes off-hook along with a message that there is no CID data available. The process of transferring the call to the extension phone that goes off-hook is detailed in the flow chart of FIGS. 12A and 12B. The call transfer process can be identical to the process of FIGS. 12A and 12B or some adaptation thereof such as not allowing voice mail recording or not allowing call waiting etc. Preferably both of these features will be utilized.

Block 974 represents the process carried out by the extension phone that went off-hook of displaying a message "no DN" meaning no dialed number thereby forcing the attendant to take the phone order manually by asking the caller his or her phone number and/or name and typing that information into a point of sale computer or terminal manually. This information can be used in the point of sale computer process to look up the caller's address for delivery purposes, or show what the customer usually orders etc.

Typically, the order taker will also push a button on the point of sale computer keyboard indicating whether the order is a take out or delivery order so the name and/or address data will be tagged with suffix or prefix data or a code indicating how the order is to be placed in the hands of the customer. The point of sale process can use this prefix or suffix data to route the order differently such as by routing it to the kitchen for preparation simultaneously with routing to a delivery dispatcher's screen to start working on the process of obtaining a delivery vehicle and driver. Typically, the order taker types a C in front of the phone number for an order that the customer will pick up or types a D in front of the phone number for an order that needs to be delivered. Block 976 represents the process of the PBX process returning to other tasks since there is nothing further to do for this call.

Block 980 represents the process carried out by the host adapter if caller ID data is received by the host adapter from the caller ID detector circuit. In step 980, the host adapter sends the caller ID data to the PBX process 444 for further processing in the CSU. In step 982, the PBX process looks up the display phones that are designated in the routing table to receiving incoming outside calls and sends a power ring signal to these phones only. To accomplish this, the CSU sends a command bit via the status and control lines of bus 414 and the power ring control shift register 712 in FIG. 13 to the host adapter 452 in FIG. 5. This control signal orders the power ring circuit 702 in FIG. 13 to generate a power ring tone command and send it to the extension phone to which the call is directed via the tip and ring lines on bus 416. This process is repeated for all the extension phones listed in the routing table.

Block 984 represents the process of waiting for one of the ringing display phones to go off-hook. When one of the phones goes off-hook, the hybrid circuit 714 in FIG. 13 sets an off-hook status bit on line 722 to the off-hook state. This bit is transferred to the host adapter and, from there to the PBX process 444 via shift register 708 and status and control portion of bus 414.

Block 986 represents the process carried out by the host adapter of determining from the position of the off-hook bit in the off-hook status bytes on bus 414 which extension phone went off-hook. Block 988 represents the process carried out by the PBX process 444 of sending a command to the host adapter to cause it to set up the multiplexer 750 in FIG. 13 for digital communication to the extension phone which went off hook. This switching control command is sent via bus 754, shift register 752 and the DTX line 756 of status and control portion of bus 414, and causes the multiplexer 750 to connect the digital comm TX line 746 and the digital comm receive line 748 to the digital T1 and R1 lines of bus 416 connected to the extension phone that went off-hook. This same processing is done in step 972 when no caller ID data is received, except the digital data sent to the extension phone that went off hook is different.

Block 990 represents the process carried out by the CSU of reformatting the caller ID data into a desired format for display on the display phone and sending it via ISA bus 446 to microcontroller 920 on FIG. 17. The display format can be any desired format such as telephone number and name displayed in the following format: (408) 778-3625 Captain Ron Piazza. Or the name can come first, the area code can be deleted and only the local phone. number displayed. The particular display format selected is not critical. The CSU then breaks the data down into packets or bytes suitable for transmission on the ISA bus according to its protocol.

Block 992 represents the process of the host adapter microcontroller receiving the CID data in the ISA bus format and reformatting it for transmission as serial data to the extension phone through the multiplexer 750 on board B of the PEU in one or more packets according to the serial data communication protocol used on the digital communication lines 746 and 748 in FIG. 17. The particulars of this data transfer such as the protocol used or the fact that it is serial or parallel format are not critical. Nor is it critical that the data be transmitted to the extension phone on separate digital communication lines through multiplexer 750 as the CID data may also be transmitted in specially assigned or dedicated timeslots through the switch chip 870 and bus 435 to the host adapter and from there through DSP 918 and the VTX line 412. In either event, block 994 represents the process of the extension phone receiving the CID data and reassembling it if necessary into the display format and displaying it.

At this point, the order taker knows the name and phone number of the customer. In the preferred embodiment, prefix or suffix data is added to the caller ID data to indicate the occurrence of certain events or the existence of certain conditions. For example, if the system is being used in a restaurant where telephone orders can be either delivered or held for customer pickup (carry-out), and the point of sale computer process processes the different orders differently, different prefix or suffix codes must be added to the CID data to control how the point of sale process handles the caller ID data. In the carry-out/delivery scenario of this example, the order taker asks the customer whether the order is to be held for pickup or is to be delivered, and presses either a carry-out button or a delivery button on the display phone depending upon the answer. Block 996 represents the process of scanning the display phone keyboard by the phone microcontroller and determining if keypress data indicates the order taker has pressed the button indicating the customer desires that the order be held for carry-out. If the carry-out button has not been pushed, the process represented by block 998 is performed to determine if the delivery button has been pushed indicating the customer desires that the order be delivered.

If the carry-out button has been pushed, the process of block 1000 is performed wherein the display phone checks the caller ID data for validity, i.e., the display phone makes sure that the data displayed appears to be a name and phone number or appears to be a valid item of caller ID data if less than all items of caller ID data are used. If the validity check of block 1000 determines that the caller ID data appears not to be valid, the caller ID data is not sent to the point of sale terminal process, as symbolized by block 1004 and the phone software process returns to other tasks, as symbolized by block 1006.

Next, if validity check of step 1000 indicates the caller ID data appears to be valid, the process of block 1000 is performed wherein the display phone formats the caller ID data into one or more alphanumeric strings that are in a format useable by whatever other computer process the caller ID data is to be sent, such as a point of sale terminal process. For example, the version of the caller ID data displayed may include a name and phone number with the phone number displayed with parentheses around the area code and a dash between the first 3 digits and the last four digits. The point of sale terminal process may want only the phone number without the area code or both the area code and phone number but with no parentheses around the area code and with a C placed before the first digit of the phone number to indicate it is a carry-out order. The process of block 1002 also adds any necessary prefix or suffix data or code to the caller ID data which is necessary to indicate to the point of sale terminal process that the caller ID data is associated with a carry-out order such as the C in the example given above.

After the caller ID data has been formatted, it is transmitted to the point of sale terminal process or other computer process using a serial bus connecting serial port 16 in FIG. 1 to the point of sale terminal (not shown). The point of sale terminal treats the incoming serial data like data entered from the keyboard regarding the customer and delivery option and processes the order according to whatever method the restaurant desires, as symbolized by block 1010.

If the process of block 998 determines that the delivery button has not been pushed, this means that neither the carry-out nor delivery button has been pushed yet, and path 1012 is followed back to step 996. If the delivery button has been pushed, the process of block 1014 is performed wherein the display phone microcontroller checks the validity of the caller ID data to determine if it appears to be valid, as was done in step 1000. If the caller ID data does not appear to be valid, the process of 1004 is performed again to block transmission of any caller ID data to the point of sale terminal process.

If the process of block 1014 determines that the caller ID data appears to be valid, the process of block 1016 is performed wherein the display phone formats the caller ID data in the way the point of say terminal process or other computer process needs it for a delivery order. Typically, this reformatting reformats the caller ID data into an alphanumeric string having the same format it would have if the order taker had typed the order into the system. Any suffix or prefix data is also added. Typically, in the example given of a restaurant, a prefix of D is added before the first digit of the phone number for delivery orders. After the process of block 1016 is performed, the processes of blocks 1008 and 1010 are performed as previously described.

The following assembly code software appendices are appended hereto: Appendix A—Switch Card DSP—Analog Devices ADSP 2115; Appendix B—Host Adapter microprocessor—Dallas Semiconductor DS87C520; Appendix C—PBX Kernel—AMD 486 or 386; Appendix D—Host Adapter DSP—Analog Devices ADSP 2115; Appendix E—Caller ID microprocessor—Dallas Semiconductor—DS80C310; Appendix F—PBX Process—AMD 486 or 386; Appendix G—Display Phone microcontroller assembly code for an Atmel AT89C52. These appendices are provided soley for purposes of making full disclosure to satisfy the requirement of 35 U.S.C. §112 and the government has a license to copy these appendices in printing the patent, but no license is granted to the government or any other entity to use the appendices to perform the processes encoded therein, prepare derivative works or do anything else other than to study them to determine the details of one exemplary species within the genus of the invention.

Although the invention has been described in terms of the preferred and alternative embodiments, those skilled in the art will appreciate other embodiments or modifications which do not depart from the genus of the invention defined herein. All such departures are intended to be included within the scope of the claims appended hereto.

What is claimed is:

1. A system for processing caller ID data for use in a process executing on a point of sale computer, comprising:

a host computer configured to control a PBX system;

a caller ID signal detector circuit coupled to the host computer and to one or more extension telephones and to one or more telephone lines, the caller ID signal detector circuit being configured to detect caller ID signals being transmitted on the telephone lines and to decode the signals into caller ID data, each of the extension telephones being configured to receive user input and to process the caller ID data, the processing including reformatting one or more items of caller ID data and appending codes to the caller ID data in accordance with the user input; and a point of sale computer or terminal coupled to the caller ID signal detector circuit and configured to execute a point of sale process, the process receiving caller ID data from the caller ID signal detector circuit;

wherein each of the extension telephones is configured to transmit the processed caller ID data to the point of sale process, and wherein the point of sale process includes one or more instructions associated with each code.

2. The system of claim 1, wherein the host computer and the point of sale computer are the same computer.

* * * * *